US009538382B2

(12) United States Patent
Bell et al.

(10) Patent No.: US 9,538,382 B2
(45) Date of Patent: Jan. 3, 2017

(54) SYSTEM AND METHOD FOR SMART REGISTRATION OF WIRELESS POWER RECEIVERS IN A WIRELESS POWER NETWORK

(71) Applicant: ENERGOUS CORPORATION, San Jose, CA (US)

(72) Inventors: Douglas Bell, Pleasanton, CA (US); Michael Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 14/586,648

(22) Filed: Dec. 30, 2014

(65) Prior Publication Data
US 2016/0100312 A1 Apr. 7, 2016

Related U.S. Application Data

(63) Continuation-in-part of application No. 14/336,987, filed on Jul. 21, 2014.

(51) Int. Cl.
H01F 38/00 (2006.01)
H04W 12/08 (2009.01)
(Continued)

(52) U.S. Cl.
CPC ............ H04W 12/08 (2013.01); G06Q 20/20 (2013.01); H02J 50/20 (2016.02); H04W 4/24 (2013.01);
(Continued)

(58) Field of Classification Search
USPC ...................................................... 307/104
See application file for complete search history.

(56) References Cited

U.S. PATENT DOCUMENTS 4,360,741 A 11/1982 Fitzsimmons et al.
5,712,642 A 1/1998 Hulderman
(Continued)

FOREIGN PATENT DOCUMENTS

EP 2545635 A2 1/2013
KR 1020130026977 A 3/2013
(Continued)

OTHER PUBLICATIONS

International Search Report dated Jan. 27, 2015 corresponding to International Patent Application No. PCT/US2014/037170, 4 pages.
(Continued)

Primary Examiner — Rexford Barnie
Assistant Examiner — Dru Parries
(74) Attorney, Agent, or Firm — Eric L. Sophir; Dentons US LLP

(57) ABSTRACT

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. A wireless power network may include a plurality of wireless power transmitters each with an embedded wireless power transmitter manager, including a wireless power manager application. The wireless power network may include a plurality of client devices with wireless power receivers. Wireless power receivers may include a power receiver application configured to communicate with the wireless power manager application. The wireless power manager application may include a device database where information about the wireless power network may be stored.

20 Claims, 19 Drawing Sheets

(51) Int. Cl.
*H04W 4/24* (2009.01)
*H04W 60/00* (2009.01)
*G06Q 20/20* (2012.01)
*H04W 84/12* (2009.01)
*H02J 7/02* (2016.01)

(52) U.S. Cl.
CPC ............ *H04W 60/005* (2013.01); *H02J 7/025* (2013.01); *H04W 84/12* (2013.01)

(56) References Cited

U.S. PATENT DOCUMENTS

| | | |
|---|---|---|
| 5,936,527 A | 8/1999 | Isaacman et al. |
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,362,745 B2 | 1/2013 | Tinaphong |
| 8,380,255 B2 | 2/2013 | Shearer et al. |
| 8,410,953 B2 | 4/2013 | Zeine |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,461,817 B2 | 6/2013 | Martin et al. |
| 8,552,597 B2 | 10/2013 | Song et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 2003/0179573 A1 | 9/2003 | Chun |
| 2004/0130425 A1 | 7/2004 | Dayan et al. |
| 2005/0007276 A1 | 1/2005 | Barrick et al. |
| 2006/0199620 A1 | 9/2006 | Greene et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0122297 A1 | 5/2008 | Arai |
| 2008/0309452 A1 | 12/2008 | Zeine |
| 2009/0067208 A1 | 3/2009 | Martin et al. |
| 2009/0200985 A1 | 8/2009 | Zane et al. |
| 2009/0243397 A1 | 10/2009 | Cook et al. |
| 2009/0286475 A1 | 11/2009 | Toncich et al. |
| 2010/0027379 A1 | 2/2010 | Saulnier et al. |
| 2010/0033021 A1 | 2/2010 | Bennett |
| 2010/0142509 A1 | 6/2010 | Zhu et al. |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0256831 A1 | 10/2010 | Abramo et al. |
| 2010/0277003 A1 | 11/2010 | Von Novak et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0043163 A1 | 2/2011 | Baarman |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0199046 A1 | 8/2011 | Tsai et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0098485 A1 | 4/2012 | Kang et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | DeLuca |
| 2012/0293021 A1 | 11/2012 | Teggatz et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0207604 A1 | 8/2013 | Zeine |
| 2013/0241468 A1 | 9/2013 | Moshfeghi |
| 2013/0241474 A1 | 9/2013 | Moshfeghi |
| 2013/0254578 A1 | 9/2013 | Huang |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0194092 A1 | 7/2014 | Wanstedt et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0357309 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| WO | 9952173 A2 | 10/1999 |
| WO | 03091943 A1 | 11/2003 |
| WO | 2004077550 A1 | 9/2004 |
| WO | 2008156571 A2 | 12/2008 |
| WO | 2010022181 A1 | 2/2010 |
| WO | 2011112022 A2 | 9/2011 |
| WO | 2013035190 A1 | 3/2013 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.

(56) References Cited

OTHER PUBLICATIONS

International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.
International Search Report and Written Opinion of the International Searching Authority, mailed Jul. 5, 2016 in International Application No. PCT/US2015/067282, 7 pages.

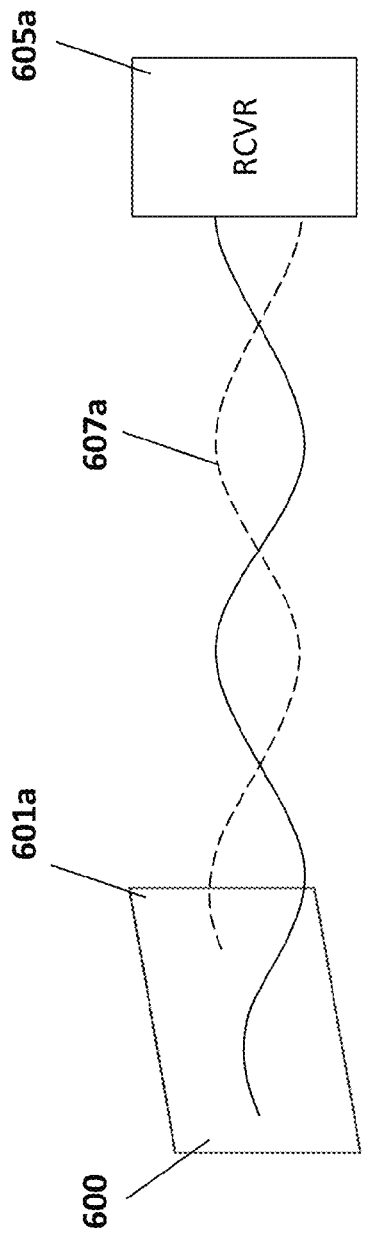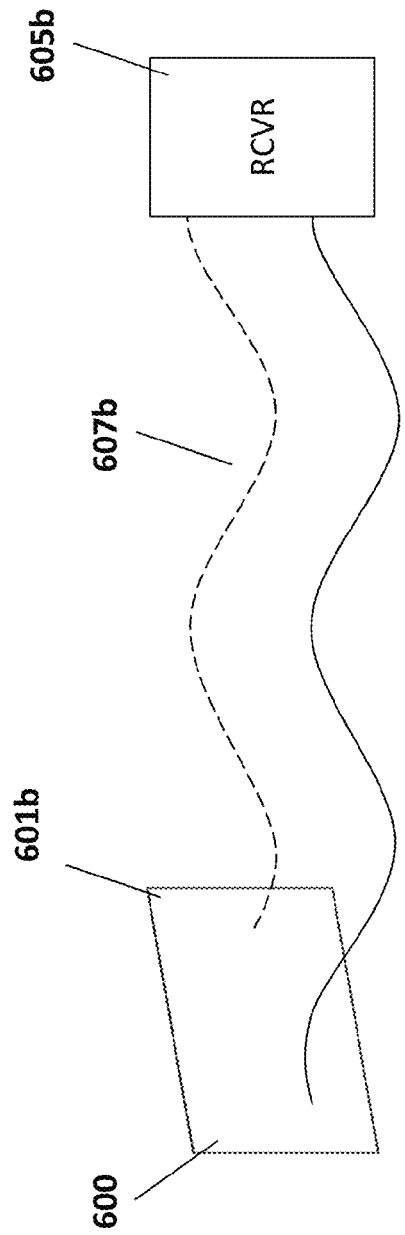

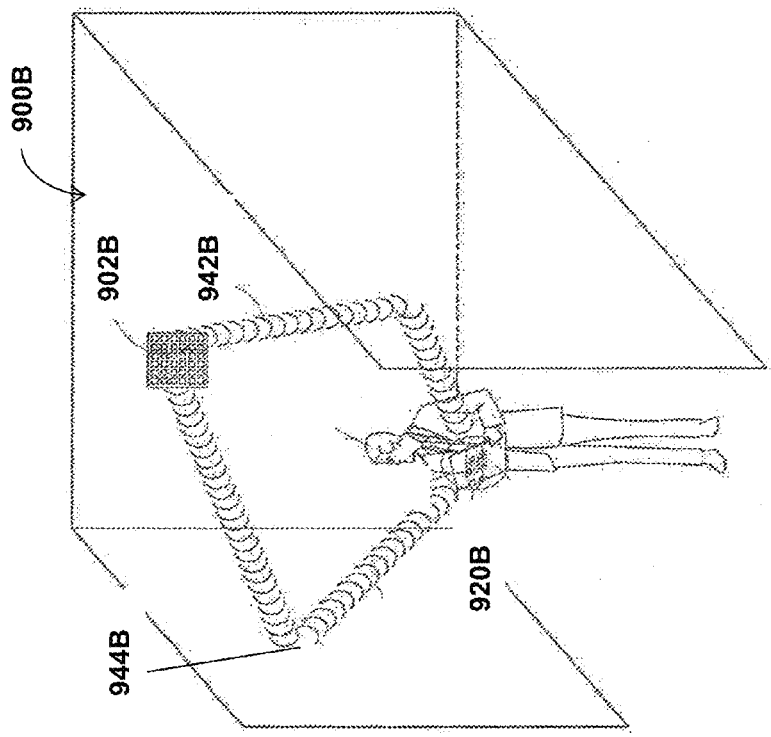
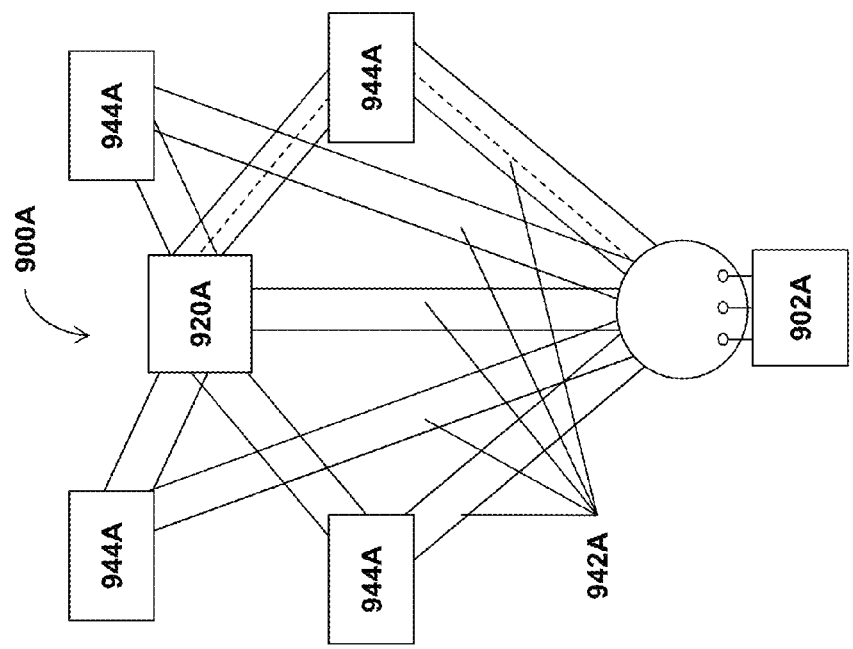
FIG. 9B
FIG. 9A

SYSTEM AND METHOD FOR SMART REGISTRATION OF WIRELESS POWER RECEIVERS IN A WIRELESS POWER NETWORK

CROSS-REFERENCE TO RELATED APPLICATIONS

This application is a continuation-in-part of U.S. Non-Provisional patent application Ser. No. 14/336,987, filed Jul. 21, 2014, entitled "System and Method for Smart Registration of Wireless Power Receivers in a Wireless Power Network," which is herein fully incorporated by reference in its entirety.

This application relates to U.S. Non-Provisional patent application Ser. No. 13/891,430, filed May 10, 2013, entitled "Methodology For Pocket-forming;" U.S. Non-Provisional patent application Ser. No. 13/925,469, filed Jun. 24, 2013, entitled "Methodology for Multiple Pocket-Forming;" U.S. Non-Provisional patent application Ser. No. 13/946,082, filed Jul. 19, 2013, entitled "Method for 3 Dimensional Pocket-forming;" U.S. Non-Provisional patent application Ser. No. 13/891,399, filed May 10, 2013, entitled "Receivers for Wireless Power Transmission;" U.S. Non-Provisional patent application Ser. No. 13/891,445, filed May 10, 2013, entitled "Transmitters for Wireless Power Transmission;" U.S. Non-Provisional patent application Ser. No. 14/286,289, filed May 23, 2014, entitled "System and Method for Generating a Power Receiver Identified in a Wireless Power Network," U.S. Non-Provisional patent application Ser. No. 14/272,039, filed May 7, 2014, entitled "Systems and Method For Wireless Transmission of Power," U.S. Non-Provisional patent application Ser. No. 14/272,066, filed May 7, 2014, entitled "Systems and Methods for Managing and Controlling a Wireless Power Network," U.S. Non-Provisional patent application Ser. No. 14/272,124, filed May 7, 2014, entitled "System and Method for Controlling Communication Between Wireless Power Transmitter Managers," U.S. Non-Provisional patent application Ser. No. 14/583,625, filed Dec. 27, 2014, entitled "Receivers for Wireless Power Transmission," U.S. Non-Provisional patent application Ser. No. 14/583,630, filed Dec. 27, 2014, entitled "Methodology for Pocket-Forming," U.S. Non-Provisional patent application Ser. No. 14/583,634, filed Dec. 27, 2014, entitled "Transmitters for Wireless Power Transmission," U.S. Non-Provisional patent application Ser. No. 14/583,640, filed Dec. 27, 2014, entitled "Methodology for Multiple Pocket-Forming," U.S. Non-Provisional patent application Ser. No. 14/583,641, filed Dec. 27, 2014, entitled "Wireless Power Transmission with Selective Range," U.S. Non-Provisional patent application Ser. No. 14/583,643, filed Dec. 27, 2014, entitled "Method for 3 Dimensional Pocket-Forming," all of which are incorporated herein by reference in their entirety.

TECHNICAL FIELD

The present disclosure relates generally to wireless power transmission.

BACKGROUND

Portable electronic devices such as smart phones, tablets, notebooks and other electronic devices have become an everyday need in the way we communicate and interact with others. The frequent use of these devices may require a significant amount of power, which may easily deplete the batteries attached to these devices. Therefore, a user is frequently needed to plug in the device to a power source, and recharge such device. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging.

Current solutions to this problem may include devices having rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. In this case, the device still requires to be placed in a certain location for a period of time in order to be charged. Assuming a single source power transmission of electromagnetic (EM) signal, an EM signal gets reduced by a factor proportional to $1/r2$ in magnitude over a distance r, in other words, it is attenuated proportional to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device.

The ability to charge electronic devices wirelessly has great benefits. However, it may be necessary to manage the access of users to the network to prevent the abuse of the system resources. For example if many devices are connected to a wireless power network, different failures can affect the network, therefore interrupting the power transfer. Failures may include a loss of power, a failure in the hardware or software of a wireless power transmitter manager, overload of the wireless power transmitter manager, and malfunctioning in a wireless power transmitter manager, among others. For the foregoing reasons, there is a need for a system and method that may allow the smart registration of wireless power receivers within a wireless power network so as to prevent the abuse of the system resources which may eventually result in a breakdown of the system.

SUMMARY

The embodiments described herein include a transmitter that transmits a power transmission signal (e.g., radio frequency (RF) signal waves) to create a three-dimensional pocket of energy. At least one receiver can be connected to or integrated into electronic devices and receive power from the pocket of energy. The transmitter can locate the at least one receiver in a three-dimensional space using a communication medium (e.g., Bluetooth technology). The transmitter generates a waveform to create a pocket of energy around each of the at least one receiver. The transmitter uses an algorithm to direct, focus, and control the waveform in three dimensions. The receiver can convert the transmission signals (e.g., RF signals) into electricity for powering an electronic device. Accordingly, the embodiments for wireless power transmission can allow powering and charging a plurality of electrical devices without wires.

A wireless power network may include wireless power transmitters each with an embedded wireless power transmitter manager. The wireless power transmitter manager may include a wireless power manager application, which may be a software application hosted in a computing device. The wireless power transmitter manager may include a GUI which may be used by a user to perform management tasks.

The wireless power network may include a plurality of client devices with wireless power receivers built in as part of the device or adapted externally. Wireless power receivers may include a power receiver application configured to communicate with the power transmitter manager application in a wireless power transmitter. The wireless power manager application may include a device database where information about the wireless power network may be stored.

In one embodiment, a wireless power system configured to provide pocket-forming energy in three-dimensional space, comprises: a wireless power transmitter, comprising a power transmitter manager comprising an antenna manager; and a storage comprising a device database, wherein the storage is operatively coupled to the power transmitter manager, wherein the wireless power transmitter is configured to receive authorization data from a device, and to determine an authorization state for the device based at least in part on the received authorization data, and wherein the wireless power transmitter is configured to control the generation of pocket-forming energy in three-dimensional space via the antenna manager based on the authorization state.

In another embodiment, a method for operating a wireless power system configured to provide pocket-forming energy in three-dimensional space, comprises: receiving, in a power transmitter manager of a transmitter, authorization data for a device; determining, in the transmitter, an authorization state for the device based at least in part on the received authorization data; and controlling, in the transmitter, the generation by an antenna manager of the transmitter of pocket-forming energy in three-dimensional space, based on the authorization state.

In another embodiment, a method for operating a wireless power system configured to provide pocket-forming energy in three-dimensional space, comprises: establishing, in a transmitter, a communications link with a device via a power transmitter manager; receiving, in the transmitter, authorization data for the device via the communications link; determining, in the transmitter, an authorization state for the device based at least in part on the received authorization data; and controlling, in the transmitter, the generation of pocket-forming energy in three-dimensional space via the power transmitter manager based on the authorization state.

In a further embodiment, an apparatus for wirelessly receiving power, comprises: a processor; communication links, operatively coupled to the processor; a memory, operatively coupled to the processor; and a receiver operatively coupled to the processor, the receiver being configured to wirelessly extract power from three-dimensional pockets of energy present in power transmission signals from one or more transmitter, wherein the processor is configured to determine if an identification value for the apparatus is stored in the memory, and, if no identification value is stored, generate an identification value for the apparatus, and wherein the processor is configured to transmit to the communication links one of (i) the stored identification value and (ii) the generated identification value, and wherein the receiver is configured to begin wirelessly extract power after the processor has transmitted the stored or generated identification value to the communication links.

In yet another embodiment, a method for enabling receipt and extraction of wireless power in an apparatus, comprises: determining, by a processor, if an identification value for the apparatus is stored in a memory; generating, by the processor, an identification value for the apparatus if the determining step determines that no identification value is stored; and transmitting, by the processor, one of (i) the stored identification value and (ii) the generated identification value, wherein after transmitting the stored or generated identification value, a receiver in the apparatus receives and extracts power from three-dimensional pockets of energy present in power transmission signals.

In still another embodiment, an apparatus for wirelessly transmitting power, comprises: a processor; communications links, operatively coupled to the processor; a memory, operatively coupled to the processor; and a transmitter operatively coupled to the processor, the transmitter being configured to wirelessly transmit three-dimensional pockets of energy present in power transmission signals, wherein the processor is configured to determine if an identification value for the apparatus is stored in the memory, and, if no identification value is stored, generate an identification value for the apparatus, and wherein the processor is configured to transmit to the communication links one of (i) the stored identification value and (ii) the generated identification value, and wherein the transmitter is configured to begin wirelessly transmitting power after the processor has transmitted the stored or generated identification value to the communication links.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 6A illustrates waveforms for wireless power transmission with selective range, which may get unified in single waveform.

FIG. 6B illustrates waveforms for wireless power transmission with selective range, which may get unified in single waveform.

FIGS. 9A and 9B illustrate a diagram of an architecture for wirelessly charging client computing platform, according to an exemplary embodiment

DETAILED DESCRIPTION

Figure 1:
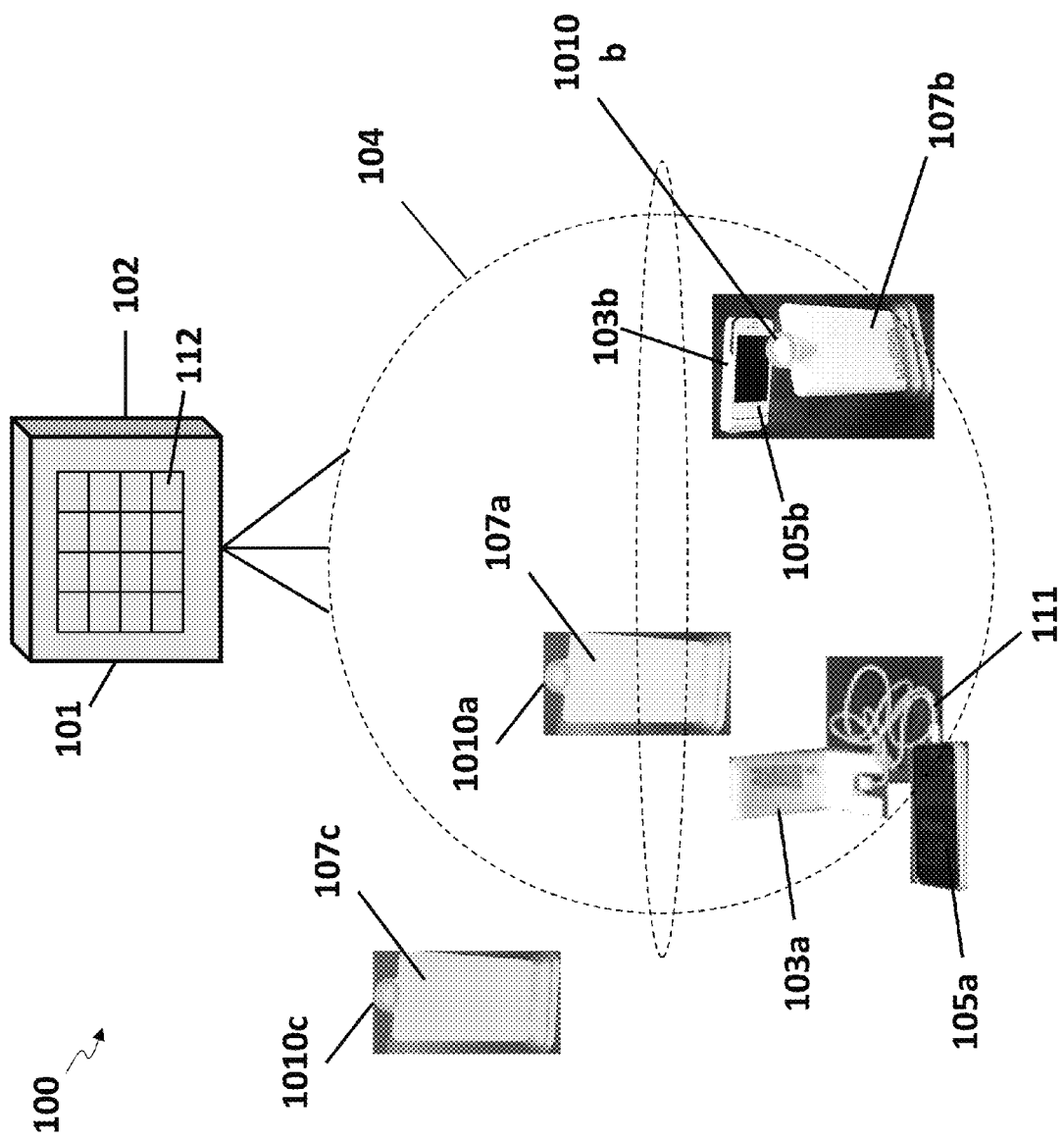
FIG. 1 illustrates a system overview, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Furthermore, the various components and embodiments described herein may be combined to form additional embodiments not expressly described, without departing from the spirit or scope of the invention.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

I. Systems and Methods for Wireless Power Transmissions

A. Components System Embodiment

FIG. 1 shows a system 100 for wireless power transmission by forming pockets of energy 104. The system 100 may comprise transmitters 101, receivers 103, client devices 105, and pocket detectors 107. Transmitters 101 may transmit power transmission signals comprising power transmission waves, which may be captured by receivers 103. The receivers 103 may comprise antennas, antenna elements, and other circuitry (detailed later), which may convert the captured waves into a useable source of electrical energy on behalf of client devices 105 associated with the receivers 103. In some embodiments, transmitters 101 may transmit power transmission signals, made up of power transmission waves, in one or more trajectories by manipulating the phase, gain, and/or other waveform features of the power transmission waves, and/or by selecting different transmit antennas. In such embodiments, the transmitters 101 may manipulate the trajectories of the power transmission signals so that the underlying power transmission waves converge at a location in space, resulting in certain forms of interference. One type of interference generated at the convergence of the power transmission waves, "constructive interference," may be a field of energy caused by the convergence of the power transmission waves such that they add together and strengthen the energy concentrated at that location—in contrast to adding together in a way to subtract from each other and diminish the energy concentrated at that location, which is called "destructive interference". The accumulation of sufficient energy at the constructive interference may establish a field of energy, or "pocket of energy" 104, which may be harvested by the antennas of a receiver 103, provided the antennas are configured to operate on the frequency of the power transmission signals. Accordingly, the power transmission waves establish pockets of energy 104 at the location in space where the receivers 103 may receive, harvest, and convert the power transmission waves into useable electrical energy, which may power or charge associated electrical client devices 105. Detectors 107 may be devices comprising a receiver 103 that are capable of producing a notification or alert in response to receiving power transmission signals. As an example, a user searching for the optimal placement of a receiver 103 to charge the user's client device 105 may use a detector 107 that comprises an LED light 108, which may brighten when the detector 107 captures the power transmission signals from a single beam or a pocket of energy 104.

1. Transmitters

The transmitter 101 may transmit or broadcast power transmission signals to a receiver 103 associated with a device 105. Although several of the embodiments mentioned below describe the power transmission signals as radio frequency (RF) waves, it should be appreciated that the power transmission may be physical media that is capable of being propagated through space, and that is capable of being converted into a source of electrical energy 103. The transmitter 101 may transmit the power transmission signals as a single beam directed at the receivers 103. In some cases, one or more transmitters 101 may transmit a plurality of power transmission signals that are propagated in a multiple directions and may deflect off of physical obstructions (e.g., walls). The plurality of power transmission signals may converge at a location in a three-dimensional space, forming a pocket of energy 104. Receivers 103 within the boundaries of an energy pocket 104 may capture and covert the power transmission signals into a useable source of energy. The transmitter 101 may control pocket-forming based on phase and/or relative amplitude adjustments of power transmission signals, to form constructive interference patterns.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 101 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure. The transmitter includes an antenna array where the antennas are used for sending the power transmission signal. Each antenna sends power transmission waves where the transmitter applies a different phase and amplitude to the signal transmitted from different antennas. Similar to the formation of pockets of energy, the transmitter can form a phased array of delayed versions of the signal to be transmitted, then applies different amplitudes to the delayed versions of the signal, and then sends the signals from appropriate antennas. For a sinusoidal waveform, such as an RF signal, ultrasound, microwave, or others, delaying the signal is similar to applying a phase shift to the signal.

2. Pockets of Energy

A pocket of energy 104 may be formed at locations of constructive interference patterns of power transmission signals transmitted by the transmitter 101. The pockets of energy 104 may manifest as a three-dimensional field where energy may be harvested by receivers 103 located within the pocket of energy 104. The pocket of energy 104 produced by transmitters 101 during pocket-forming may be harvested by a receiver 103, converted to an electrical charge, and then provided to electronic client device 105 associated with the receiver 103 (e.g., laptop computer, smartphone, rechargeable battery). In some embodiments, there may be multiple transmitters 101 and/or multiple receivers 103 powering various client devices 105. In some embodiments, adaptive pocket-forming may adjust transmission of the power transmission signals in order to regulate power levels and/or identify movement of the devices 105.

3. Receivers

A receiver 103 may be used for powering or charging an associated client device 105, which may be an electrical device coupled to or integrated with the receiver 103. The receiver 103 may receive power transmission waves from one or more power transmission signals originating from one or more transmitters 101. The receiver 103 may receive the power transmission signals as a single beam produced by the transmitter 101, or the receiver 103 may harvest power transmission waves from a pocket of energy 104, which may be a three-dimensional field in space resulting from the convergence of a plurality of power transmission waves produced by one or more transmitters 101. The receiver 103 may comprise an array of antennas 112 configured to receive power transmission waves from a power transmission signal and harvest the energy from the power transmission signals of the single beam or pocket of energy 104. The receiver 103 may comprise circuitry that then converts the energy of the power transmission signals (e.g., the radio frequency electromagnetic radiation) to electrical energy. A rectifier of the receiver 103 may translate the electrical energy from AC to DC. Other types of conditioning may be applied, as well. For example, a voltage conditioning circuit may increase or decrease the voltage of the electrical energy as required by the client device 105. An electrical relay may then convey the electrical energy from the receiver 103 to the client device 105.

In some embodiments, the receiver 103 may comprise a communications component that transmits control signals to the transmitter 101 in order to exchange data in real-time or near real-time. The control signals may contain status information about the client device 105, the receiver 103, or the power transmission signals. Status information may include, for example, present location information of the device 105, amount of charge received, amount of charged used, and user account information, among other types of information. Further, in some applications, the receiver 103 including the rectifier that it contains may be integrated into the client device 105. For practical purposes, the receiver 103, wire 111, and client device 105 may be a single unit contained in a single packaging.

4. Control Signals

In some embodiments, control signals may serve as data inputs used by the various antenna elements responsible for controlling production of power transmission signals and/or pocket-forming. Control signals may be produced by the receiver 103 or the transmitter 101 using an external power supply (not shown) and a local oscillator chip (not shown), which in some cases may include using a piezoelectric material. Control signals may be RF waves or any other communication medium or protocol capable of communicating data between processors, such as Bluetooth®, RFID, infrared, near-field communication (NFC). As detailed later, control signals may be used to convey information between the transmitter 101 and the receiver 103 used to adjust the power transmission signals, as well as contain information related to status, efficiency, user data, power consumption, billing, geo-location, and other types of information.

5. Detectors

A detector 107 may comprise hardware similar to receivers 103, which may allow the detector 107 to receive power transmission signals originating from one or more transmitters 101. The detector 107 may be used by users to identify the location of pockets of energy 104, so that users may determine the preferable placement of a receiver 103. In some embodiments, the detector 107 may comprise an indicator light 108 that indicates when the detector is placed within the pocket of energy 104. As an example, in FIG. 1, detectors 107a, 107b are located within the pocket of energy 104 generated by the transmitter 101, which may trigger the detectors 107a, 107b to turn on their respective indicator lights 108a, 108b, because the detectors 107a, 107b are receiving power transmission signals of the pocket of energy 104; whereas, the indicator light 108c of a third detector 107c located outside of the pockets of energy 104, is turned off, because the third detector 107c is not receiving the power transmission signals from the transmitter 101. It should be appreciated that the functions of a detector, such as the indicator light, may be integrated into a receiver or into a client device in alternative embodiments as well.

6. Client Device

A client device 105 may be any electrical device that requires continuous electrical energy or that requires power from a battery. Non-limiting examples of client devices 105 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

In some embodiments, the client device 105a may be a physical device distinct from the receiver 103a associated with the client device 105a. In such embodiments, the client device 105a may be connected to the receiver over a wire 111 that conveys converted electrical energy from the receiver 103a to the client device 105a. In some cases, other types of data may be transported over the wire 111, such as power consumption status, power usage metrics, device identifiers, and other types of data.

In some embodiments, the client device 105b may be permanently integrated or detachably coupled to the receiver 103b, thereby forming a single integrated product or unit. As an example, the client device 105b may be placed into a sleeve that has embedded receivers 103b and that may detachably couple to the device's 105b power supply input, which may be typically used to charge the device's 105b battery. In this example, the device 105b may be decoupled from the receiver, but may remain in the sleeve regardless of whether or not the device 105b requires an electrical charge or is being used. In another example, in lieu of having a battery that holds a charge for the device 105b, the device 105b may comprise an integrated receiver 105b, which may be permanently integrated into the device 105b so as to form an indistinct product, device, or unit. In this example, the device 105b may rely almost entirely on the integrated receiver 103b to produce electrical energy by harvesting pockets of energy 104. It should be clear to someone skilled in the art that the connection between the receiver 103 and the client device 105 may be a wire 111 or may be an electrical connection on a circuit board or an integrated circuit, or even a wireless connection, such as inductive or magnetic.

B. Method of Wireless Power Transmission

Figure 2:
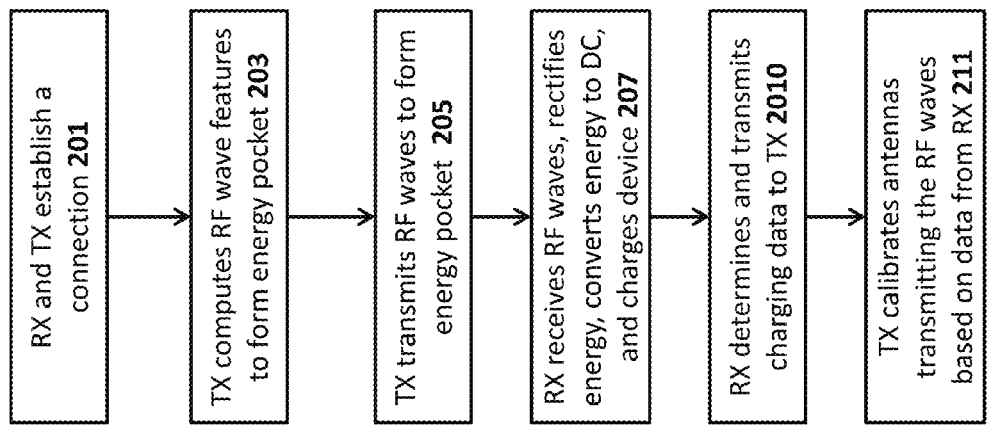
FIG. 2 illustrates steps of wireless power transmission, according to an exemplary embodiment.

FIG. 2 shows steps of wireless power transmission, according to an exemplary method 200 embodiment.

In a first step 201, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, Bluetooth Low Energy (BLE), Wi-Fi, NFC, Zig-Bee®). For example, in embodiments implementing Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

In a next step 203, the transmitter may use the advertisement signal to determine a set of power transmission signal features for transmitting the power transmission signals, to then establish the pockets of energy. Non-limiting examples of features of power transmission signals may include phase, gain, amplitude, magnitude, and direction among others. The transmitter may use information contained in the receiver's advertisement signal, or in subsequent control signals received from the receiver, to determine how to produce and transmit the power transmission signals so that the receiver may receive the power transmission signals. In some cases, the transmitter may transmit power transmission signals in a way that establishes a pocket of energy, from which the receiver may harvest electrical energy. In some embodiments, the transmitter may comprise a processor executing software modules capable of automatically identifying the power transmission signal features needed to establish a pocket of energy based on information received from the receiver, such as the voltage of the electrical energy harvested by the receiver from the power transmission signals. It should be appreciated that in some embodiments, the functions of the processor and/or the software modules may be implemented in an Application Specific Integrated Circuit (ASIC).

Additionally or alternatively, in some embodiments, the advertisement signal or subsequent signal transmitted by the receiver over a second communications channel may indicate one or more power transmission signals features, which the transmitter may then use to produce and transmit power transmission signals to establish a pocket of energy. For example, in some cases the transmitter may automatically identify the phase and gain necessary for transmitting the power transmission signals based on the location of the device and the type of device or receiver; and, in some cases, the receiver may inform the transmitter the phase and gain for effectively transmitting the power transmission signals.

In a next step 205, after the transmitter determines the appropriate features to use when transmitting the power transmission signals, the transmitter may begin transmitting power transmission signals, over a separate channel from the control signals. Power transmission signals may be transmitted to establish a pocket of energy. The transmitter's antenna elements may transmit the power transmission signals such that the power transmission signals converge in a two-dimensional or three-dimensional space around the receiver. The resulting field around the receiver forms a pocket of energy from which the receiver may harvest electrical energy. One antenna element may be used to transmit power transmission signals to establish two-dimensional energy transmissions; and in some cases, a second or additional antenna element may be used to transmit power transmission signals in order to establish a three-dimensional pocket of energy. In some cases, a plurality of antenna elements may be used to transmit power transmission signals in order to establish the pocket of energy. Moreover, in some cases, the plurality of antennas may include all of the antennas in the transmitter; and, in some cases, the plurality of antennas may include a number of the antennas in the transmitter, but fewer than all of the antennas of the transmitter.

As previously mentioned, the transmitter may produce and transmit power transmission signals, according to a determined set of power transmission signal features, which may be produced and transmitted using an external power source and a local oscillator chip comprising a piezoelectric material. The transmitter may comprise an RFIC that controls production and transmission of the power transmission signals based on information related to power transmission and pocket-forming received from the receiver. This control data may be communicated over a different channel from the power transmission signals, using wireless communications protocols, such as BLE, NFC, or ZigBee®. The RFIC of the transmitter may automatically adjust the phase and/or relative magnitudes of the power transmission signals as needed. Pocket-forming is accomplished by the transmitter transmitting the power transmission signals in a manner that forms constructive interference patterns.

Antenna elements of the transmitter may use concepts of wave interference to determine certain power transmission signals features (e.g., direction of transmission, phase of power transmission signal wave), when transmitting the power transmission signals during pocket-forming. The antenna elements may also use concepts of constructive interference to generate a pocket of energy, but may also utilize concepts of deconstructive interference to generate a transmission null in a particular physical location.

In some embodiments, the transmitter may provide power to a plurality of receivers using pocket-forming, which may require the transmitter to execute a procedure for multiple pocket-forming. A transmitter comprising a plurality of antenna elements may accomplish multiple pocket-forming by automatically computing the phase and gain of power transmission signal waves, for each antenna element of the transmitter tasked with transmitting power transmission signals the respective receivers. The transmitter may compute the phase and gains independently, because multiple wave paths for each power transmission signal may be generated by the transmitter's antenna elements to transmit the power transmission signals to the respective antenna elements of the receiver.

As an example of the computation of phase/gain adjustments for two antenna elements of the transmitter transmitting two signals, say X and Y where Y is 180 degree phase shifted version of X (Y=−X). At a physical location where the cumulative received waveform is X−Y, a receiver receives X−Y=X+X=2X, whereas at a physical location where the cumulative received waveform is X+Y, a receiver receives X+Y=X−X=0.

In a next step 207, the receiver may harvest or otherwise receive electrical energy from power transmission signals of a single beam or a pocket of energy. The receiver may comprise a rectifier and AC/DC converter, which may convert the electrical energy from AC current to DC current, and a rectifier of the receiver may then rectify the electrical energy, resulting in useable electrical energy for a client device associated with the receiver, such as a laptop computer, smartphone, battery, toy, or other electrical device. The receiver may utilize the pocket of energy produced by the transmitter during pocket-forming to charge or otherwise power the electronic device.

In next step 209, the receiver may generate control data containing information indicating the effectiveness of the single beam or energy pockets providing the receiver power transmission signals. The receiver may then transmit control signals containing the control data, to the transmitter. The control signals may be transmitted intermittently, depending on whether the transmitter and receiver are communicating synchronously (i.e., the transmitter is expecting to receive control data from the receiver). Additionally, the transmitter may continuously transmit the power transmission signals to the receiver, irrespective of whether the transmitter and receiver are communicating control signals. The control data may contain information related to transmitting power transmission signals and/or establishing effective pockets of energy. Some of the information in the control data may inform the transmitter how to effectively produce and transmit, and in some cases adjust, the features of the power transmission signals. Control signals may be transmitted and received over a second channel, independent from the power transmission signals, using a wireless protocol capable of transmitting control data related to power transmission signals and/or pocket-forming, such as BLE, NFC, Wi-Fi, or the like.

As mentioned, the control data may contain information indicating the effectiveness of the power transmission signals of the single beam or establishing the pocket of energy. The control data may be generated by a processor of the receiver monitoring various aspects of receiver and/or the client device associated with the receiver. The control data may be based on various types of information, such as the voltage of electrical energy received from the power transmission signals, the quality of the power transmission signals reception, the quality of the battery charge or quality of the power reception, and location or motion of the receiver, among other types of information useful for adjusting the power transmission signals and/or pocket-forming.

In some embodiments, a receiver may determine the amount of power being received from power transmission signals transmitted from the transmitter and may then indicate that the transmitter should "split" or segment the power transmission signals into less-powerful power transmission signals. The less-powerful power transmission signals may be bounced off objects or walls nearby the device, thereby reducing the amount of power being transmitted directly from the transmitter to the receiver.

In a next step 211, the transmitter may calibrate the antennas transmitting the power transmission signals, so that the antennas transmit power transmission signals having a more effective set of feature (e.g., direction, phase, gain, amplitude). In some embodiments, a processor of the transmitter may automatically determine more effective features for producing and transmitting the power transmission signals based on a control signal received from the receiver. The control signal may contain control data, and may be transmitted by the receiver using any number of wireless communication protocols (e.g., BLE, Wi-Fi, ZigBee®). The control data may contain information expressly indicating the more effective features for the power transmission waves; or the transmitter may automatically determine the more effective features based on the waveform features of the control signal (e.g., shape, frequency, amplitude). The transmitter may then automatically reconfigure the antennas to transmit recalibrated power transmission signals according to the newly determined more-effective features. For example, the processor of the transmitter may adjust gain and/or phase of the power transmission signals, among other features of power transmission feature, to adjust for a change in location of the receiver, after a user moved the receiver outside of the three-dimensional space where the pocket of energy is established.

C. System Architecture of Power Transmission System

Figure 3:
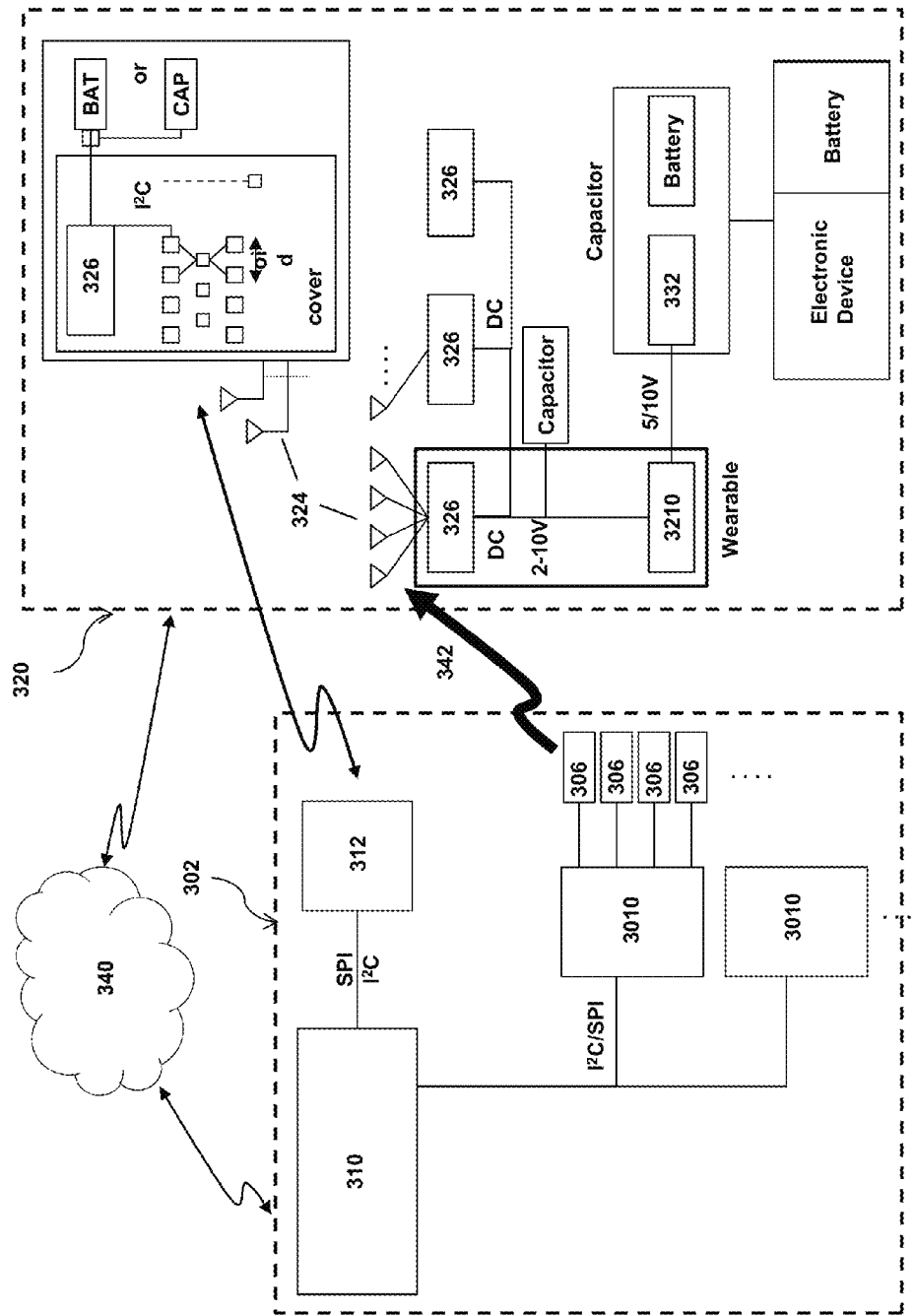
FIG. 3 illustrates an architecture for wireless power transmission, according to an exemplary embodiment.

FIG. 3 illustrates an architecture 300 for wireless power transmission using pocket-forming, according to an exemplary embodiment. "Pocket-forming" may refer to generating two or more power transmission waves 342 that converge at a location in three-dimensional space, resulting in constructive interference patterns at that location. A transmitter 302 may transmit and/or broadcast controlled power transmission waves 342 (e.g., microwaves, radio waves, ultrasound waves) that may converge in three-dimensional space. These power transmission waves 342 may be controlled through phase and/or relative amplitude adjustments to form constructive interference patterns (pocket-forming) in locations where a pocket of energy is intended. It should be understood also that the transmitter can use the same principles to create destructive interference in a location thereby creating a transmission null—a location where transmitted power transmission waves cancel each other out substantially and no significant energy can be collected by a receiver. In typical use cases the aiming of a power transmission signal at the location of the receiver is the objective; and in other cases it may be desirable to specifically avoid power transmission to a particular location; and in other cases it may be desirable to aim power transmission signal at a location while specifically avoiding transmission to a second location at the same time. The transmitter takes the use case into account when calibrating antennas for power transmission.

Antenna elements 306 of the transmitter 302 may operate in single array, pair array, quad array, or any other suitable arrangement that may be designed in accordance with the desired application. Pockets of energy may be formed at constructive interference patterns where the power transmission waves 342 accumulate to form a three-dimensional field of energy, around which one or more corresponding transmission null in a particular physical location may be generated by destructive interference patterns. Transmission null in a particular physical location—may refer to areas or regions of space where pockets of energy do not form because of destructive interference patterns of power transmission waves 342.

A receiver 320 may then utilize power transmission waves 342 emitted by the transmitter 302 to establish a pocket of energy, for charging or powering an electronic device 313, thus effectively providing wireless power transmission. Pockets of energy may refer to areas or regions of space where energy or power may accumulate in the form of constructive interference patterns of power transmission waves 342. In other situations there can be multiple transmitters 302 and/or multiple receivers 320 for powering various electronic equipment for example smartphones, tablets, music players, toys and others at the same time. In other embodiments, adaptive pocket-forming may be used to regulate power on electronic devices. Adaptive pocket-forming may refer to dynamically adjusting pocket-forming to regulate power on one or more targeted receivers.

Receiver 320 may communicate with transmitter 302 by generating a short signal through antenna elements 324 in order to indicate its position with respect to the transmitter 302. In some embodiments, receiver 320 may additionally utilize a network interface card (not shown) or similar computer networking component to communicate through a network 340 with other devices or components of the system 300, such as a cloud computing service that manages several collections of transmitters 302. The receiver 320 may comprise circuitry 308 for converting the power transmission signals 342 captured by the antenna elements 324, into electrical energy that may be provided to and electric device 313 and/or a battery of the device 315. In some embodiments, the circuitry may provide electrical energy to a battery of receiver 335, which may store energy without the electrical device 313 being communicatively coupled to the receiver 320.

Communications components 324 may enable receiver 320 to communicate with the transmitter 302 by transmitting control signals 345 over a wireless protocol. The wireless protocol can be a proprietary protocol or use a conventional wireless protocol, such as Bluetooth®, BLE, Wi-Fi, NFC, ZigBee, and the like. Communications component 324 may then be used to transfer information, such as an identifier for the electronic device 313, as well as battery level information, geographic location data, or other information that may be of use for transmitter 302 in determining when to send power to receiver 320, as well as the location to deliver power transmission waves 342 creating pockets of energy. In other embodiments, adaptive pocket-forming may be used to regulate power provided to electronic devices 313. In such embodiments, the communications components 324 of the receiver may transmit voltage data indicating the amount of power received at the receiver 320, and/or the amount of voltage provided to an electronic device 313b or battery 315.

Once transmitter 302 identifies and locates receiver 320, a channel or path for the control signals 345 can be established, through which the transmitter 302 may know the gain and phases of the control signals 345 coming from receiver 320. Antenna elements 306 of the transmitter 302 may start to transmit or broadcast controlled power transmission waves 342 (e.g., radio frequency waves, ultrasound waves), which may converge in three-dimensional space by using at least two antenna elements 306 to manipulate the power transmission waves 342 emitted from the respective antenna element 306. These power transmission waves 342 may be produced by using an external power source and a local oscillator chip using a suitable piezoelectric material. The power transmission waves 342 may be controlled by transmitter circuitry 301, which may include a proprietary chip for adjusting phase and/or relative magnitudes of power transmission waves 342. The phase, gain, amplitude, and other waveform features of the power transmission waves 342 may serve as inputs for antenna element 306 to form constructive and destructive interference patterns (pocket-forming). In some implementations, a micro-controller 310 or other circuit of the transmitter 302 may produce a power transmission signal, which comprises power transmission waves 342, and that may be may split into multiple outputs by transmitter circuitry 301, depending on the number of antenna elements 306 connected to the transmitter circuitry 301. For example, if four antenna elements 306a-d are connected to one transmitter circuit 301a, the power transmission signal will be split into four different outputs each output going to an antenna element 306 to be transmitted as power transmission waves 342 originating from the respective antenna elements 306.

Pocket-forming may take advantage of interference to change the directionality of the antenna element 306 where constructive interference generates a pocket of energy and destructive interference generates a transmission null. Receiver 320 may then utilize pocket of energy produced by pocket-forming for charging or powering an electronic device and therefore effectively providing wireless power transmission.

Multiple pocket-forming may be achieved by computing the phase and gain from each antenna 306 of transmitter 302 to each receiver 320.

D. Components of Systems Forming Pockets of Energy

Figure 4:
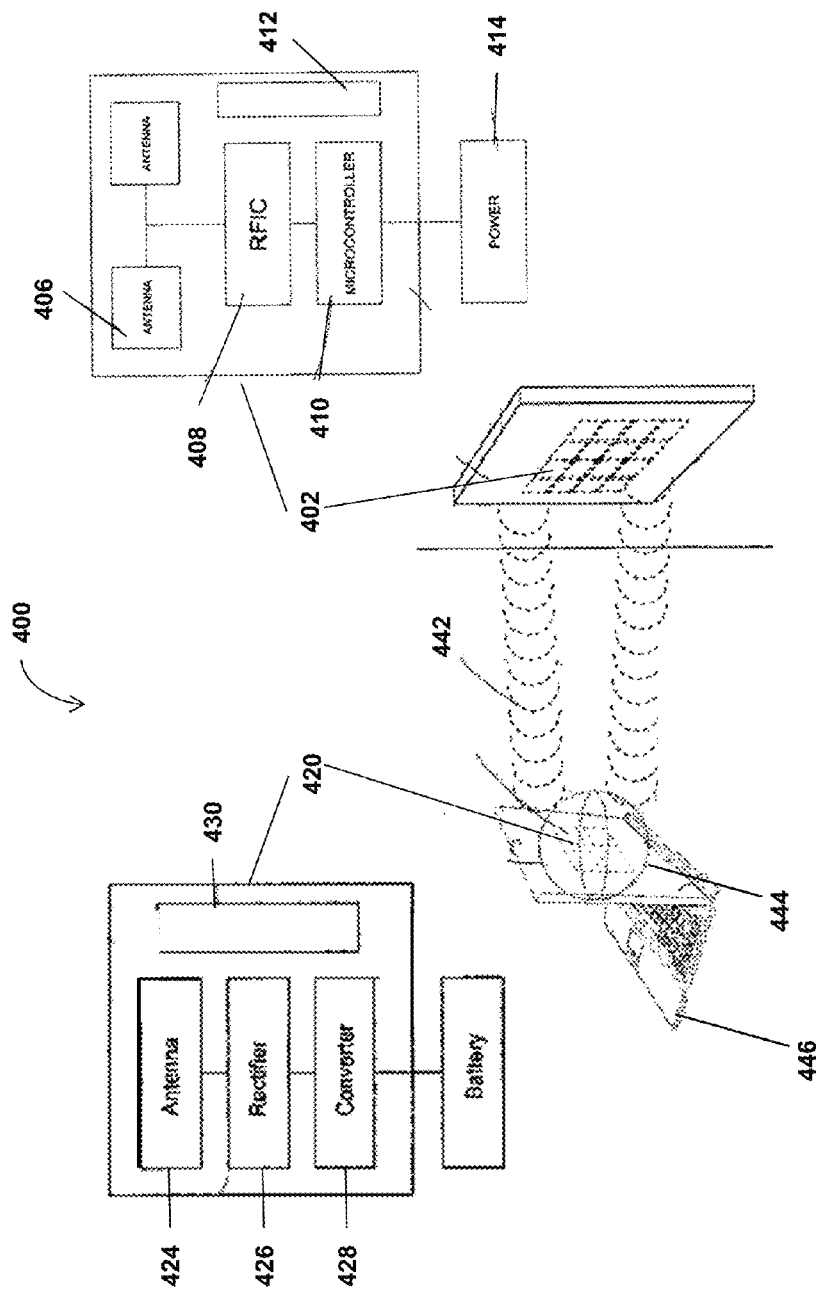
FIG. 4 illustrates components of a system of wireless power transmission using pocket-forming procedures, according to an exemplary embodiment.

FIG. 4 shows components of an exemplary system 400 of wireless power transmission using pocket-forming procedures. The system 400 may comprise one or more transmitters 402, one or more receivers 420, and one or more client devices 446.

1. Transmitters

Transmitters 402 may be any device capable of broadcasting wireless power transmission signals, which may be RF waves 442, for wireless power transmission, as described herein. Transmitters 402 may be responsible for performing tasks related to transmitting power transmission signals, which may include pocket-forming, adaptive pocket-forming, and multiple pocket-forming. In some implementations, transmitters 402 may transmit wireless power transmissions to receivers 420 in the form of RF waves, which may include any radio signal having any frequency or wavelength. A transmitter 402 may include one or more antenna elements 406, one or more RFICs 408, one or more microcontrollers 410, one or more communication components 412, a power source 414, and a housing that may allocate all the requested components for the transmitter 402. The various components of transmitters 402 may comprise, and/or may be manufactured using, meta-materials, micro-printing of circuits, nano-materials, and the like.

In the exemplary system 400, the transmitter 402 may transmit or otherwise broadcast controlled RF waves 442 that converge at a location in three-dimensional space, thereby forming a pocket of energy 444. These RF waves may be controlled through phase and/or relative amplitude adjustments to form constructive or destructive interference patterns (i.e., pocket-forming). Pockets of energy 444 may be fields formed at constructive interference patterns and may be three-dimensional in shape; whereas transmission null in a particular physical location may be generated at destructive interference patterns. Receivers 420 may harvest electrical energy from the pockets of energy 444 produced by pocket-forming for charging or powering an electronic client device 446 (e.g., a laptop computer, a cell phone). In some embodiments, the system 400 may comprise multiple transmitters 402 and/or multiple receivers 420, for powering various electronic equipment. Non-limiting examples of client devices 446 may include: smartphones, tablets, music players, toys and others at the same time. In some embodiments, adaptive pocket-forming may be used to regulate power on electronic devices.

2. Receivers

Receivers 420 may include a housing where at least one antenna element 424, one rectifier 426, one power converter 428, and a communications component 430 may be included.

Housing of the receiver 420 can be made of any material capable of facilitating signal or wave transmission and/or reception, for example plastic or hard rubber. Housing may be an external hardware that may be added to different electronic equipment, for example in the form of cases, or can be embedded within electronic equipment as well.

3. Antenna Elements

Antenna elements 424 of the receiver 420 may comprise any type of antenna capable of transmitting and/or receiving signals in frequency bands used by the transmitter 402A. Antenna elements 424 may include vertical or horizontal polarization, right hand or left hand polarization, elliptical polarization, or other polarizations, as well as any number of polarization combinations. Using multiple polarizations can be beneficial in devices where there may not be a preferred orientation during usage or whose orientation may vary continuously through time, for example a smartphone or portable gaming system. For devices having a well-defined expected orientation (e.g., a two-handed video game controller), there might be a preferred polarization for antennas, which may dictate a ratio for the number of antennas of a given polarization. Types of antennas in antenna elements 424 of the receiver 420, may include patch antennas, which may have heights from about ⅛ inch to about 6 inches and widths from about ⅛ inch to about 6 inches. Patch antennas may preferably have polarization that depends upon connectivity, i.e., the polarization may vary depending on from which side the patch is fed. In some embodiments, the type of antenna may be any type of antenna, such as patch antennas, capable of dynamically varying the antenna polarization to optimize wireless power transmission.

4. Rectifier

Rectifiers 426 of the receiver 420 may include diodes, resistors, inductors, and/or capacitors to rectify alternating current (AC) voltage generated by antenna elements 424 to direct current (DC) voltage. Rectifiers 426 may be placed as close as is technically possible to antenna elements A24B to minimize losses in electrical energy gathered from power transmission signals. After rectifying AC voltage, the resulting DC voltage may be regulated using power converters 428. Power converters 428 can be a DC-to-DC converter that may help provide a constant voltage output, regardless of input, to an electronic device, or as in this exemplary system 400, to a battery. Typical voltage outputs can be from about 5 volts to about 10 volts. In some embodiments, power converter may include electronic switched mode DC-DC converters, which can provide high efficiency. In such embodiments, the receiver 420 may comprise a capacitor (not shown) that is situated to receive the electrical energy before power converters 428. The capacitor may ensure sufficient current is provided to an electronic switching device (e.g., switch mode DC-DC converter), so it may operate effectively. When charging an electronic device, for example a phone or laptop computer, initial high-currents that can exceed the minimum voltage needed to activate operation of an electronic switched mode DC-DC converter, may be required. In such a case, a capacitor (not shown) may be added at the output of receivers 420 to provide the extra energy required. Afterwards, lower power can be provided. For example, ⅟₈₀ of the total initial power that may be used while having the phone or laptop still build-up charge.

5. Communications Component

A communications component 430 of a receiver 420 may communicate with one or more other devices of the system 400, such as other receivers 420, client devices, and/or transmitters 402. Different antenna, rectifier or power converter arrangements are possible for a receiver as will be explained in following embodiments.

E. Methods of Pocket Forming for a Plurality of Devices

Figure 5:
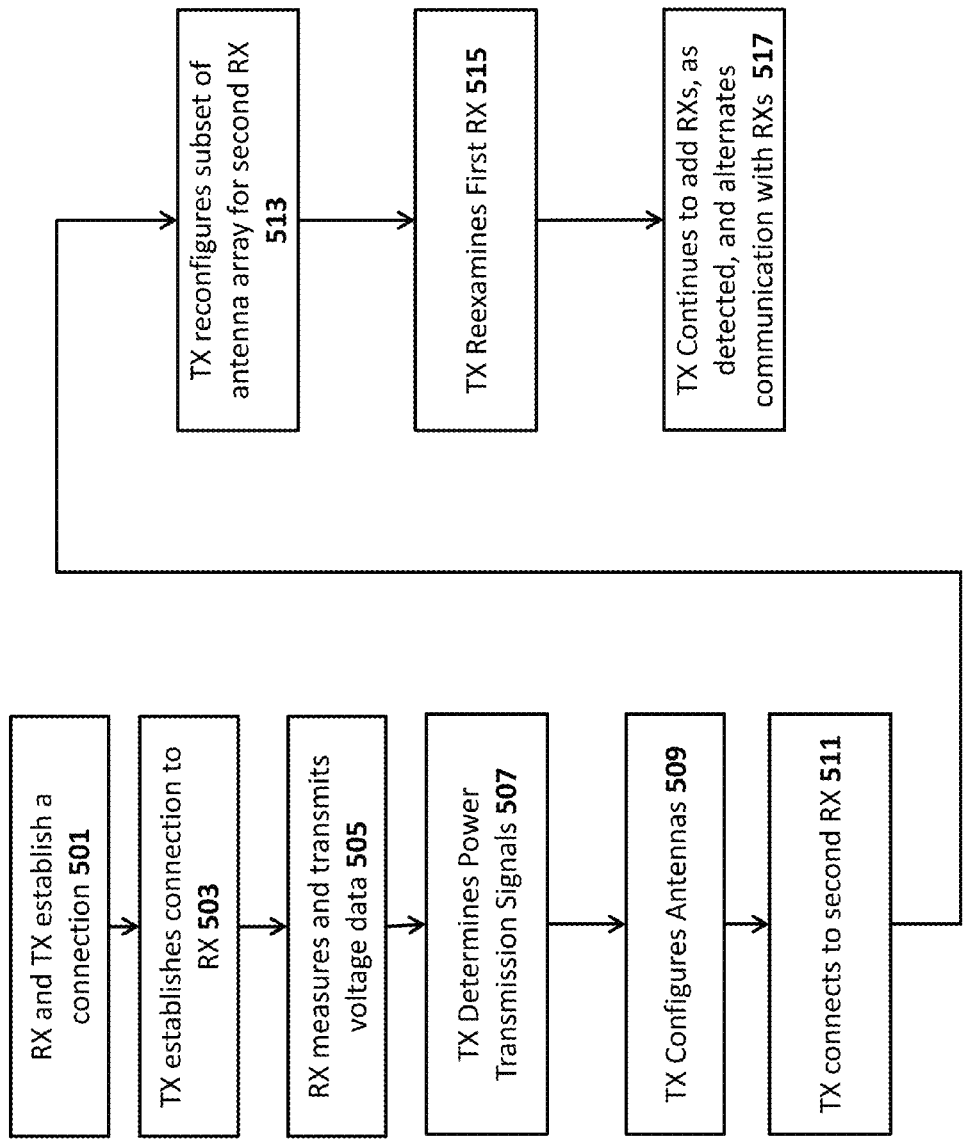
FIG. 5 illustrates steps of powering a plurality of receiver devices, according to an exemplary embodiment.

FIG. 5 shows steps of powering a plurality of receiver devices, according to an exemplary embodiment.

In a first step 501, a transmitter (TX) establishes a connection or otherwise associates with a receiver (RX). That is, in some embodiments, transmitters and receivers may communicate control data over using a wireless communication protocol capable of transmitting information between two processors of electrical devices (e.g., Bluetooth®, BLE, Wi-Fi, NFC, ZigBee®). For example, in embodiments implement Bluetooth® or Bluetooth® variants, the transmitter may scan for receiver's broadcasting advertisement signals or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate control signals over a second channel.

As an example, when a receiver comprising a Bluetooth® processor is powered-up or is brought within a detection range of the transmitter, the Bluetooth processor may begin advertising the receiver according to Bluetooth® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically form a communication connection with that receiver, which may allow the transmitter and receiver to communicate control signals and power transmission signals. The transmitter may then command that receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of 100 times per second. The receiver may transmit the voltage sample measurement back to the transmitter, 100 times a second, in the form of control signals.

In a next step 507, the transmitter may execute one or more software modules monitoring the metrics, such as voltage measurements, received from the receiver. Algorithms may vary production and transmission of power transmission signals by the transmitter's antennas, to maximize the effectiveness of the pockets of energy around the receiver. For example, the transmitter may adjust the phase at which the transmitter's antenna transmit the power transmission signals, until that power received by the receiver indicates an effectively established pocket energy around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continues to receive and monitor the voltage being reported back from receiver.

In a next step 511, after a determined period of time for communicating with a particular receiver, the transmitter may scan and/or automatically detect advertisements from other receivers that may be in range of the transmitter. The transmitters may establish a connection to the second receiver responsive to Bluetooth® advertisements from a second receiver.

In a next step 513, after establishing a second communication connection with the second receiver, the transmitter may proceed to adjust one or more antennas in the transmitter's antenna array. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power transmission waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising that it's a Bluetooth device through the Bluetooth chip. Inside the advertisement, there may be unique identifiers so that the transmitter, when it scanned that advertisement, could distinguish that advertisement and ultimately that receiver from all the other Bluetooth devices nearby within range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may getting as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

F. Wireless Power Transmission with Selective Range

1. Constructive Interference

FIG. 6A and FIG. 6B show an exemplary system 600 implementing wireless power transmission principles that may be implemented during exemplary pocket-forming processes. A transmitter 601 comprising a plurality of antennas in an antenna array, may adjust the phase and amplitude, among other possible attributes, of power transmission waves 607, being transmitted from antennas of the transmitter 601. As shown in FIG. 6A, in the absence of any phase or amplitude adjustment, power transmission waves 607a may be transmitted from each of the antennas will arrive at different locations and have different phases. These differences are often due to the different distances from each antenna element of the transmitter 601a to a receiver 605a or receivers 605a, located at the respective locations.

Continuing with FIG. 6A, a receiver 605a may receive multiple power transmission signals, each comprising power transmission waves 607a, from multiple antenna elements of a transmitter 601a; the composite of these power transmission signals may be essentially zero, because in this example, the power transmission waves add together destructively. That is, antenna elements of the transmitter 601a may transmit the exact same power transmission signal (i.e., comprising power transmission waves 607a having the same features, such as phase and amplitude), and as such, when the power transmission waves 607a of the respective power transmission signals arrive at the receiver 605a, they are offset from each other by 180 degrees. Consequently, the power transmission waves 607a of these power transmission signals "cancel" one another. Generally, signals offsetting one another in this way may be referred to as "destructive," and thus result in "destructive interference."

In contrast, as shown in FIG. 6B, for so-called "constructive interference," signals comprising power transmission waves 607b that arrive at the receiver exactly "in phase" with one another, combine to increase the amplitude of the each signal, resulting in a composite that is stronger than each of the constituent signals. In the illustrative example in FIG. 6A, note that the phase of the power transmission waves 607a in the transmit signals are the same at the location of transmission, and then eventually add up destructively at the location of the receiver 605a. In contrast, in FIG. 6B, the phase of the power transmission waves 607b of the transmit signals are adjusted at the location of transmission, such that they arrive at the receiver 605b in phase alignment, and consequently they add constructively. In this illustrative example, there will be a resulting pocket of energy located around the receiver 605b in FIG. 6B; and there will be a transmission null located around receiver in FIG. 6A.

Figure 7:
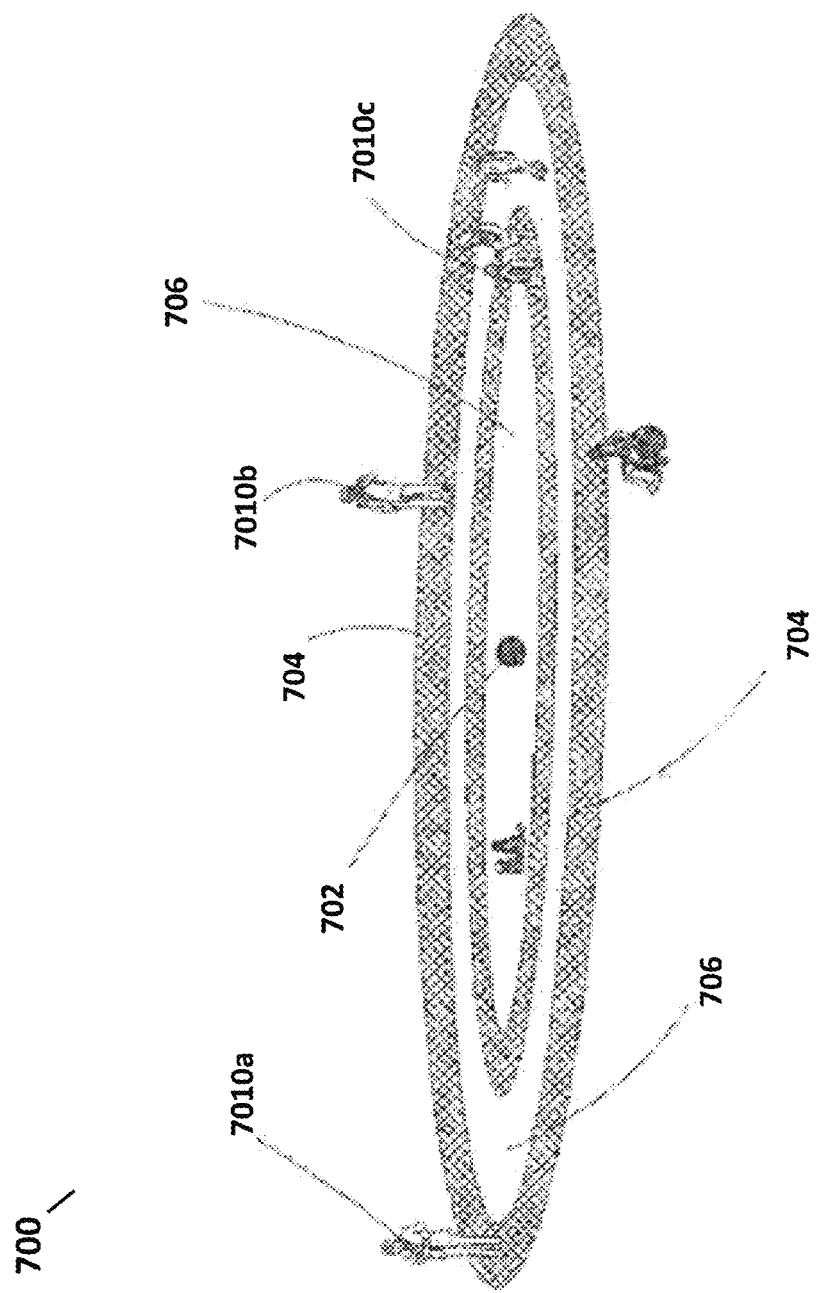
FIG. 7 illustrates wireless power transmission with selective range, where a plurality of pockets of energy may be generated along various radii from transmitter.

FIG. 7 depicts wireless power transmission with selective range 700, where a transmitter 702 may produce pocket-forming for a plurality of receivers associated with electrical devices 701. Transmitter 702 may generate pocket-forming through wireless power transmission with selective range 700, which may include one or more wireless charging radii 704 and one or more radii of a transmission null at a particular physical location 706. A plurality of electronic devices 701 may be charged or powered in wireless charging radii 704. Thus, several spots of energy may be created, such spots may be employed for enabling restrictions for powering and charging electronic devices 701. As an example, the restrictions may include operating specific electronics in a specific or limited spot, contained within wireless charging radii 704. Furthermore, safety restrictions may be implemented by the use of wireless power transmission with selective range 700, such safety restrictions may avoid pockets of energy over areas or zones where energy needs to be avoided, such areas may include areas including sensitive equipment to pockets of energy and/or people which do not want pockets of energy over and/or near them. In embodiments such as the one shown in FIG. 7, the transmitter 702 may comprise antenna elements found on a different plane than the receivers associated with electrical devices 701 in the served area. For example the receivers of electrical devices 701 may be in a room where a transmitter 702 may be mounted on the ceiling. Selective ranges for establishing pockets of energy using power transmission waves, which may be represented as concentric circles by placing an antenna array of the transmitter 702 on the ceiling or other elevated location, and the transmitter 702 may emit power transmission waves that will generate 'cones' of energy pockets. In some embodiments, the transmitter 701 may control the radius of each charging radii 704, thereby establishing intervals for service area to create pockets of energy that are pointed down to an area at a lower plane, which may adjust the width of the cone through appropriate selection of antenna phase and amplitudes.

Figure 8:
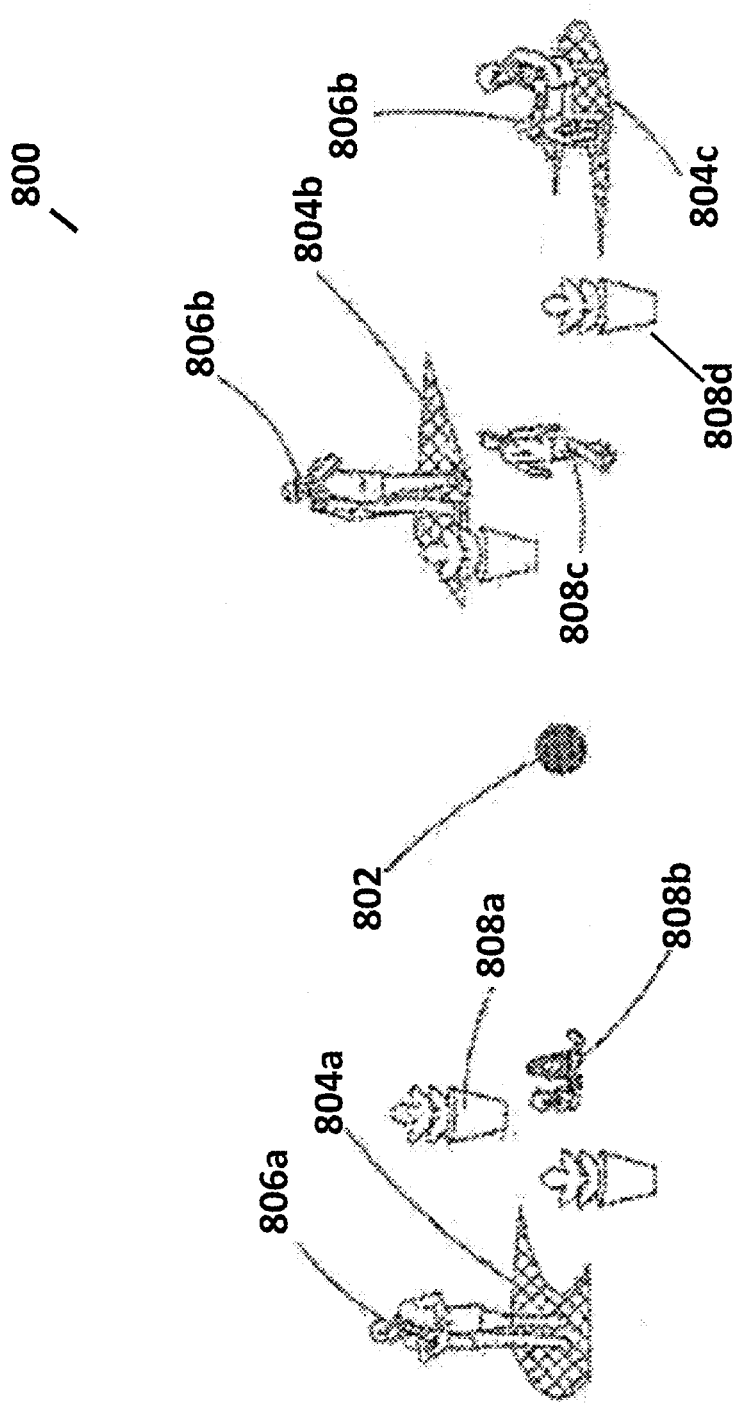
FIG. 8 illustrates wireless power transmission with selective range, where a plurality of pockets of energy may be generated along various radii from transmitter.

FIG. 8 depicts wireless power transmission with selective range 800, where a transmitter 802 may produce pocket-forming for a plurality of receivers 806. Transmitter 802 may generate pocket-forming through wireless power transmission with selective range 800, which may include one or more wireless charging spots 804. A plurality of electronic devices may be charged or powered in wireless charging spots 804. Pockets of energy may be generated over a plurality of receivers 806 regardless the obstacles 804 surrounding them. Pockets of energy may be generated by creating constructive interference, according to the principles described herein, in wireless charging spots 804. Location of pockets of energy may be performed by tacking receivers 806 and by enabling a plurality of communication protocols by a variety of communication systems such as, Bluetooth® technology, infrared communication, Wi-Fi, FM radio, among others.

G. Exemplary System Embodiment Using Heat Maps

FIGS. 9A and 9B illustrate a diagram of architecture 900A, 900B for a wirelessly charging client computing platform, according to an exemplary embodiment. In some implementations, a user may be inside a room and may hold on his hands an electronic device (e.g. a smartphone, tablet). In some implementations, electronic device may be on furniture inside the room. The electronic device may include a receiver 920A, 920B either embedded to the electronic device or as a separate adapter connected to electronic device. Receivers 920A, 920B may include all the components described in FIG. 11. A transmitter 902A, 902B may be hanging on one of the walls of the room right behind user. Transmitters 902A, 902B may also include all the components described in FIG. 11.

As user may seem to be obstructing the path between receivers 920A, 920B and transmitters 902A, 902B, RF waves may not be easily aimed to the receivers 920A, 920B in a linear direction. However, since the short signals generated from receivers 920A, 920B may be omni-directional for the type of antenna element used, these signals may bounce over the walls 944A, 944B until they reach transmitters 902A, 902B. A hot spot 944A, 944B may be any item in the room which will reflect the RF waves. For example, a large metal clock on the wall may be used to reflect the RF waves to a user's cell phone.

A micro controller in the transmitter adjusts the transmitted signal from each antenna based on the signal received from the receiver. Adjustment may include forming conjugates of the signal phases received from the receivers and further adjustment of transmit antenna phases taking into account the built-in phase of antenna elements. The antenna element may be controlled simultaneously to steer energy in a given direction. The transmitter 902A, 902B may scan the room, and look for hot spots 944A, 944B. Once calibration is performed, transmitters 902A, 902B may focus RF waves in a channel following a path that may be the most efficient paths. Subsequently, RF signals 942A, 942B may form a pocket of energy on a first electronic device and another pocket of energy in a second electronic device while avoiding obstacles such as user and furniture.

When scanning the service area, the room in FIGS. 9A and 9B, the transmitter 902A, 902B may employ different methods. As an illustrative example, but without limiting the possible methods that can be used, the transmitter 902A, 902B may detect the phases and magnitudes of the signal coming from the receiver and use those to form the set of transmit phases and magnitudes, for example by calculating conjugates of them and applying them at transmit. As another illustrative example, the transmitter may apply all possible phases of transmit antennas in subsequent transmissions, one at a time, and detect the strength of the pocket of energy formed by each combination by observing information related to the signal from the receiver 920A, 920B. Then the transmitter 902A, 902B repeats this calibration periodically. In some implementations, the transmitter 902A, 902B does not have to search through all possible phases, and can search through a set of phases that are more likely to result in strong pockets of energy based on prior calibration values. In yet another illustrative example, the transmitter 902A, 902B may use preset values of transmit phases for the antennas to form pockets of energy directed to different locations in the room. The transmitter may for example scan the physical space in the room from top to bottom and left to right by using preset phase values for antennas in subsequent transmissions. The transmitter 902A, 902B then detects the phase values that result in the strongest pocket of energy around the receiver 920a, 920b by observing the signal from the receiver 920a, 920b. It should be appreciated that there are other possible methods for scanning a service area for heat mapping that may be employed, without deviating from the scope or spirit of the embodiments described herein. The result of a scan, whichever method is used, is a heat-map of the service area (e.g., room, store) from which the transmitter 902A, 902B may identify the hot spots that indicate the best phase and magnitude values to use for transmit antennas in order to maximize the pocket of energy around the receiver.

The transmitters 902A, 902B, may use the Bluetooth connection to determine the location of the receivers 920A, 920B, and may use different non-overlapping parts of the RF band to channel the RF waves to different receivers 920A, 920B. In some implementations, the transmitters 902A, 902B, may conduct a scan of the room to determine the location of the receivers 920A, 920B and forms pockets of energy that are orthogonal to each other, by virtue of non-overlapping RF transmission bands. Using multiple pockets of energy to direct energy to receivers may inherently be safer than some alternative power transmission methods since no single transmission is very strong, while the aggregate power transmission signal received at the receiver is strong.

H. Exemplary System Embodiment

Figure 10A:
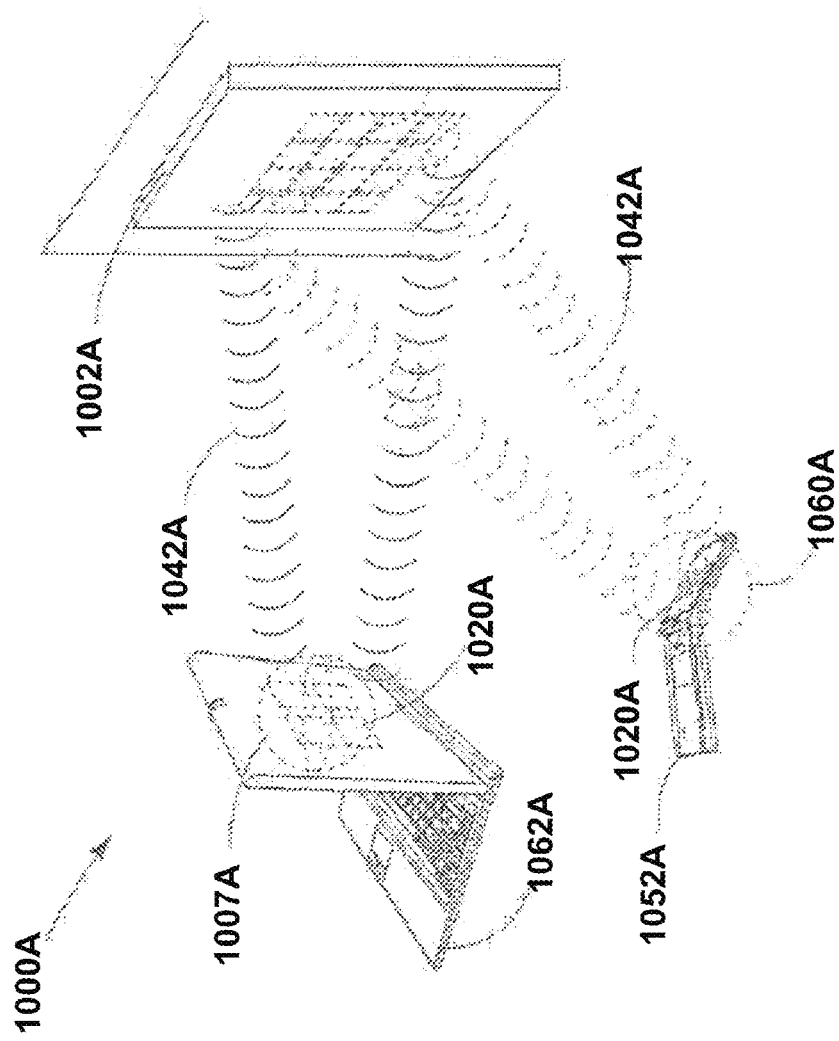
FIG. 10A illustrates wireless power transmission using multiple pocket-forming, according to an exemplary embodiment.

FIG. 10A illustrates wireless power transmission using multiple pocket-forming 1000A that may include one transmitter 1002A and at least two or more receivers 1020A. Receivers 1020A may communicate with transmitters 1002A, which is further described in FIG. 11. Once transmitter 1002A identifies and locates receivers 1020A, a channel or path can be established by knowing the gain and phases coming from receivers 1020A. Transmitter 1002A may start to transmit controlled RF waves 1042A which may converge in three-dimensional space by using a minimum of two antenna elements. These RF waves 1042A may be produced using an external power source and a local oscillator chip using a suitable piezoelectric material. RF waves 1042A may be controlled by RFIC, which may include a proprietary chip for adjusting phase and/or relative magnitudes of RF signals that may serve as inputs for antenna elements to form constructive and destructive interference patterns (pocket-forming). Pocket-forming may take advantage of interference to change the directionality of the antenna elements where constructive interference generates a pocket of energy 1060A and deconstructive interference generates a transmission null. Receivers 1020A may then utilize pocket of energy 1060A produced by pocket-forming for charging or powering an electronic device, for example, a laptop computer 1062A and a smartphone 1052A and thus effectively providing wireless power transmission.

Multiple pocket forming 1000A may be achieved by computing the phase and gain from each antenna of transmitter 1002A to each receiver 1020A. The computation may be calculated independently because multiple paths may be generated by antenna element from transmitter 1002A to antenna element from receivers 1020A.

I. Exemplary System Embodiment

Figure 10B:
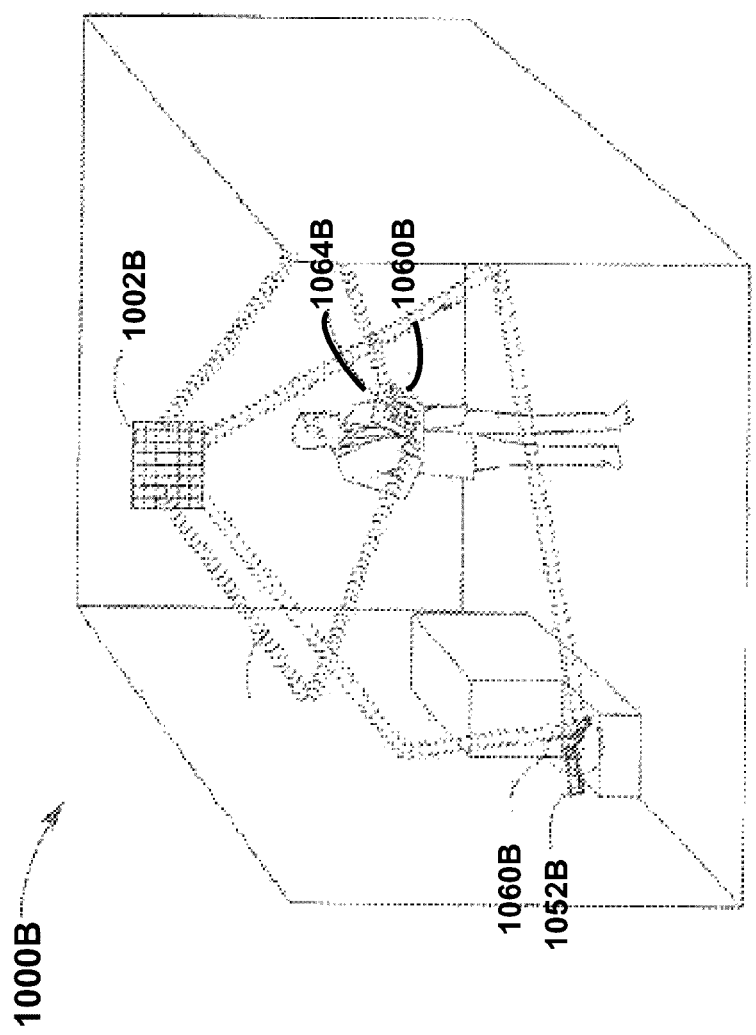
FIG. 10B illustrates multiple adaptive pocket-forming, according to an exemplary embodiment.

FIG. 10B is an exemplary illustration of multiple adaptive pocket-forming 1000B. In this embodiment, a user may be inside a room and may hold on his hands an electronic device, which in this case may be a tablet 1064B. In addition, smartphone 1052B may be on furniture inside the room. Tablet 1064B and smartphone 1052B may each include a receiver either embedded to each electronic device or as a separate adapter connected to tablet 1064B and smartphone 1052B. Receiver may include all the components described in FIG. 11. A transmitter 1002B may be hanging on one of the walls of the room right behind user. Transmitter 1002B may also include all the components described in FIG. 11. As user may seem to be obstructing the path between receiver and transmitter 1002B, RF waves 1042B may not be easily aimed to each receiver in a line of sight fashion. However, since the short signals generated from receivers may be omni-directional for the type of antenna elements used, these signals may bounce over the walls until they find transmitter 1002B. Almost instantly, a micro-controller which may reside in transmitter 1002B, may recalibrate the transmitted signals, based on the received signals sent by each receiver, by adjusting gain and phases and forming a convergence of the power transmission waves such that they add together and strengthen the energy concentrated at that location—in contrast to adding together in a way to subtract from each other and diminish the energy concentrated at that location, which is called "destructive interference" and conjugates of the signal phases received from the receivers and further adjustment of transmit antenna phases taking into account the built-in phase of antenna elements. Once calibration is performed, transmitter 1002B may focus RF waves following the most efficient paths. Subsequently, a pocket of energy 1060B may form on tablet 1064B and another pocket of energy 1060B in smartphone 1052B while taking into account obstacles such as user and furniture. The foregoing property may be beneficial in that wireless power transmission using multiple pocket-forming 1000B may inherently be safe as transmission along each pocket of energy is not very strong, and that RF transmissions generally reflect from living tissue and do not penetrate.

Once transmitter 1002B identities and locates receiver, a channel or path can be established by knowing the gain and phases coming from receiver. Transmitter 1002B may start to transmit controlled RF waves 1042B that may converge in three-dimensional space by using a minimum of two antenna elements. These RF waves 1042B may be produced using an external power source and a local oscillator chip using a suitable piezoelectric material. RF waves 1042B may be controlled by RFIC that may include a proprietary chip for adjusting phase and/or relative magnitudes of RF signals, which may serve as inputs for antenna elements to form constructive and destructive interference patterns (pocket-forming). Pocket-forming may take advantage of interference to change the directionality of the antenna elements where constructive interference generates a pocket of energy and deconstructive interference generates a null in a particular physical location. Receiver may then utilize pocket of energy produced by pocket-forming for charging or powering an electronic device, for example a laptop computer and a smartphone and thus effectively providing wireless power transmission.

Multiple pocket-forming 1000B may be achieved by computing the phase and gain from each antenna of transmitter to each receiver. The computation may be calculated independently because multiple paths may be generated by antenna elements from transmitter to antenna elements from receiver.

An example of the computation for at least two antenna elements may include determining the phase of the signal from the receiver and applying the conjugate of the receive parameters to the antenna elements for transmission.

In some embodiments, two or more receivers may operate at different frequencies to avoid power losses during wireless power transmission. This may be achieved by including an array of multiple embedded antenna elements in transmitter 1002B. In one embodiment, a single frequency may be transmitted by each antenna in the array. In other embodiments some of the antennas in the array may be used to transmit at a different frequency. For example, ½ of the antennas in the array may operate at 2.4 GHz while the other ½ may operate at 5.8 GHz. In another example, ⅓ of the antennas in the array may operate at 900 MHz, another ⅓ may operate at 2.4 GHz, and the remaining antennas in the array may operate at 5.8 GHz.

In another embodiment, each array of antenna elements may be virtually divided into one or more antenna elements during wireless power transmission, where each set of antenna elements in the array can transmit at a different frequency. For example, an antenna element of the transmitter may transmit power transmission signals at 2.4 GHz, but a corresponding antenna element of a receiver may be configured to receive power transmission signals at 5.8 GHz. In this example, a processor of the transmitter may adjust the antenna element of the transmitter to virtually or logically divide the antenna elements in the array into a plurality patches that may be fed independently. As a result, ¼ of the array of antenna elements may be able to transmit the 5.8 GHz needed for the receiver, while another set of antenna elements may transmit at 2.4 GHz. Therefore, by virtually dividing an array of antenna elements, electronic devices coupled to receivers can continue to receive wireless power transmission. The foregoing may be beneficial because, for example, one set of antenna elements may transmit at about 2.4 GHz and other antenna elements may transmit at 5.8 GHz, and thus, adjusting a number of antenna elements in a given array when working with receivers operating at different frequencies. In this example, the array is divided into equal sets of antenna elements (e.g., four antenna elements), but the array may be divided into sets of different amounts of antenna elements. In an alternative embodiment, each antenna element may alternate between select frequencies.

The efficiency of wireless power transmission as well as the amount of power that can be delivered (using pocket-forming) may be a function of the total number of antenna elements 1006 used in a given receivers and transmitters system. For example, for delivering about one watt at about 15 feet, a receiver may include about 80 antenna elements while a transmitter may include about 256 antenna elements. Another identical wireless power transmission system (about 1 watt at about 15 feet) may include a receiver with about 40 antenna elements, and a transmitter with about 512 antenna elements. Reducing in half the number of antenna elements in a receiver may require doubling the number of antenna elements in a transmitter. In some embodiments, it may be beneficial to put a greater number of antenna elements in transmitters than in a receivers because of cost, because there will be much fewer transmitters than receivers in a system-wide deployment. However, the opposite can be achieved, e.g., by placing more antenna elements on a receiver than on a transmitter as long as there are at least two antenna elements in a transmitter 1002B.

II. Wireless Power Software Management System

A. Systems and Methods for Managing and Controlling a Wireless Power Network (Basic)

Figure 11:
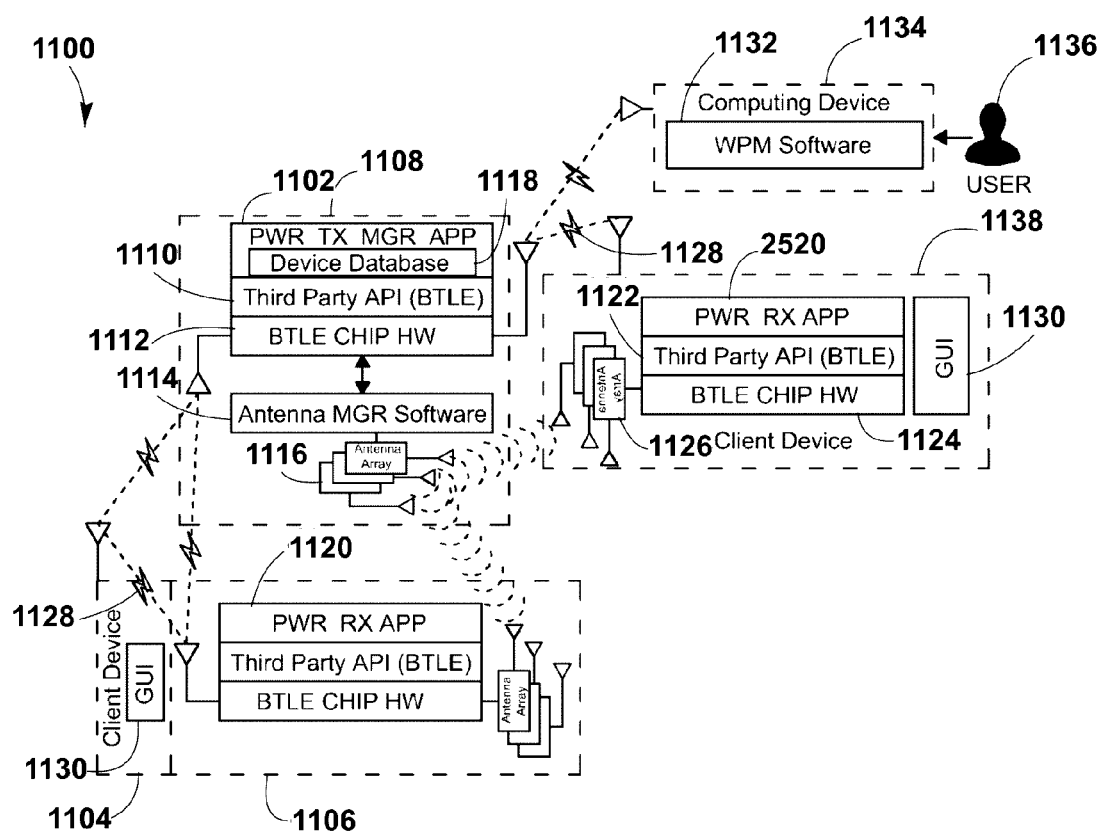
FIG. 11 illustrates an exemplary embodiment of a wireless power network including a transmitter an wireless receivers.

FIG. 11 shows an exemplary embodiment of a wireless power network 1100 in which one or more embodiments of the present disclosure may operate. Wireless power network 1100 may include communication between wireless power transmitter 1102 and one or more wireless powered receivers. Wireless powered receivers may include a client device 1104 with an adaptable paired receiver 1106 that may enable wireless power transmission to the client device 1104. In another embodiment, a client device 1104 include a wireless power receiver built in as part of the hardware of the device. Client device 1104 may be any device which uses an energy power source, such as, laptop computers, stationary computers, mobile phones, tablets, mobile gaming devices, televisions, radios and/or any set of appliances that may require or benefit from an electrical power source.

In one embodiment, wireless power transmitter 1102 may include a microprocessor that integrates a power transmitter manager app 1108 (PWR TX MGR APP) as embedded software, and a third party application programming interface 1110 (Third Party API) for a Bluetooth Low Energy chip 1112 (BLE CHIP HW). Bluetooth Low Energy chip 1112 may enable communication between wireless power transmitter 1102 and other devices such as, client device 1104. In some embodiment, Bluetooth Low Energy chip 1112 may be utilize another type of wireless protocol such as Bluetooth®, Wi-Fi, NFC, and ZigBee. Wireless power transmitter 1102 may also include an antenna manager software 1114 (Antenna MGR Software) to control an RF antenna array 1116 that may be used to form controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a receiver converting the transmitted energy to electrical power.

Power transmitter manager app 1108 may call third party application programming interface 1110 for running a plurality of functions such as starting a connection, ending a connection, and sending data among others. Third party application programming interface 1110 may command Bluetooth Low Energy chip 1112 according to the functions called by power transmitter manager app 1108.

Power transmitter manager app 1108 may also include a database 1118, which may store database comprising identification and attribute information of the wireless power transmitter 1102, of the receiver 1106, and of client devices 1104. Exemplary identification and attribute information includes identifiers for a client device 1104, voltage ranges for a client device 1104, location, signal strength and/or any relevant information from a client device 1104. Database 1118 may also store information relevant to the wireless power network such as, receiver ID's, transmitter ID's, end-user handheld devices, system management servers, charging schedules (information indicative of the scheduling of a charge time for the client device 1104), charging priorities and/or any data relevant to a wireless power network. Other examples of identification and attribute information include information indicative of level of power usage of one of the client device 1104; information indicative of power received at the receiver 1106 that is available to the client device 1104; and information of the duration of power usage of the client device.

Third party application programming interface 1110 at the same time may call power transmitter manager app 1108 through a callback function which may be registered in the power transmitter manager app 1108 at boot time. Third party application programming interface 1110 may have a timer callback that may go for ten times a second, and may send callbacks every time a connection begins, a connection ends, a connection is attempted, or a message is received.

Client device 1104 may include a power receiver app 1120 (PWR RX APP), a third party application programming interface 1122 (Third party API) for a Bluetooth Low Energy chip 1124 (BLE CHIP HW), and a RF antenna array 1126 which may be used to receive and utilize the pockets of energy sent from wireless power transmitter 1102.

Power receiver app 1120 may call third party application programming interface 1122 for running a plurality of functions such as start a connection, end the connection, and send data among others. Third party application programming interface 1122 may have a timer callback that may go for ten times a second, and may send callbacks every time a connection begins, a connection ends, a connection is attempted, or message is received.

Client device 1104 may be paired to an adaptable paired receiver 1106 via a BLE connection 1128. A graphical user interface (GUI 1130) may be used to manage the wireless power network from a client device 1104. GUI 1130 may be a software module that may be downloaded from any suitable application store and may run on any suitable operating system such as iOS and Android, among others. Client device 1104 may also communicate with wireless power transmitter 1102 via a BLE connection 1128 to send important data such as an identifier for the device as well as battery level information, antenna voltage, geographic location data, or other information that may be of use for the wireless power transmitter 1102.

A wireless power manager 1132 software may be used in order to manage wireless power network 1100. Wireless power manager 1132 may be a software module hosted in memory and executed by a processor inside a computing device 1134. The wireless power manager 1132 may include instructions to generate outputs and to receive inputs via a Graphical User Interface (GUI), so that a user 1136 may see options and statuses, and may enter commands to manage the wireless power network 1100. The computing device 1134 may be connected to the wireless power transmitter 1102 through standard communication protocols which may include Bluetooth®, Bluetooth Low Energy (BLE), Wi-Fi, NFC, and ZigBee®. Power transmitter manager app 1108 may exchange information with wireless power manager 1132 in order to control access and power transmission from client devices 1104. Functions controlled by the wireless power manager 1132 may include, scheduling power transmission for individual devices, priorities between different client devices, access credentials for each client, physical location, broadcasting messages, and/or any functions required to manage the wireless power network 1100.

Figure 12:
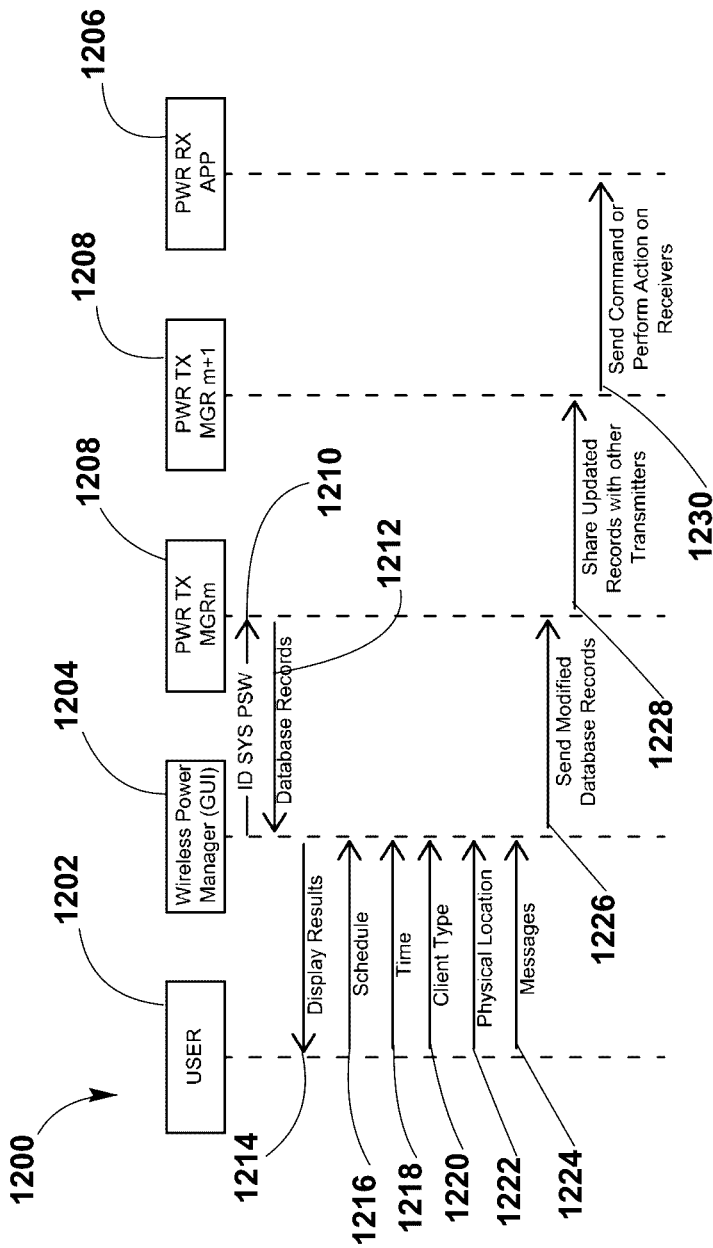
FIG. 12 shows a sequence diagram of real time communication between wireless power transmitters, wireless power receivers, a wireless power manager UI and a user, according to an embodiment.

FIG. 12 shows a sequence diagram 1200 for a real time communication between wireless powered transmitters and wireless powered receivers, according to an embodiment.

Sequence diagram 1200 illustrates the interactions between objects or roles in a wireless powered network. The objects or roles described here may include, but is not limited to, a user 1202 which manages the wireless power network, a wireless power manager 1204 which serves as a front end application for managing the wireless power network, power receiver devices with corresponding power receiver apps 1206 and transmitters with corresponding power transmitter manager apps 1208.

The process may begin when wireless power manager 1204 requests 1210 information from a power transmitter manager app 1208 hosted in a wireless transmitter. Request 1210 may include authentication security such as user name and password. Power transmitter manager apps 1208 may then verify the request 1210 and grant access to the wireless power manager 1204.

Power. Wireless power manager 1204 may continuously request 1210 information for different time periods in order to continue updating itself. Power transmitter manager app 1208 may then send database records 1212 to the wireless power manager 1204. Wireless power manager 1204 may then display 1214 these records with options in a suitable GUI to a user 1202. User 1202 may then perform different actions in order to manage the wireless power network. For example and without limitation, a user 1202 may configure powering schedules 1216 for different devices, the user 1202 may also establish priorities depending on time 1218, type of client 1220, physical location 1222 or may even choose to broadcast a message 1224 to client devices. The wireless power manager 1204 may then send 1226 the updated database records back to the power transmitter manager apps 1208.

In a wireless network power grid more than one transmitter may be used. Power transmitter manager apps 1208 hosted on each transmitter may share updates 1228 to the device database. Power transmitter manager apps 1208 may then perform an action 1230 depending on the command and updates made by the user 1202 such as, charge a wireless device, send a message to the wireless devices, set a schedule to charge different devices, set power priority to specific devices, etc.

Figure 13:
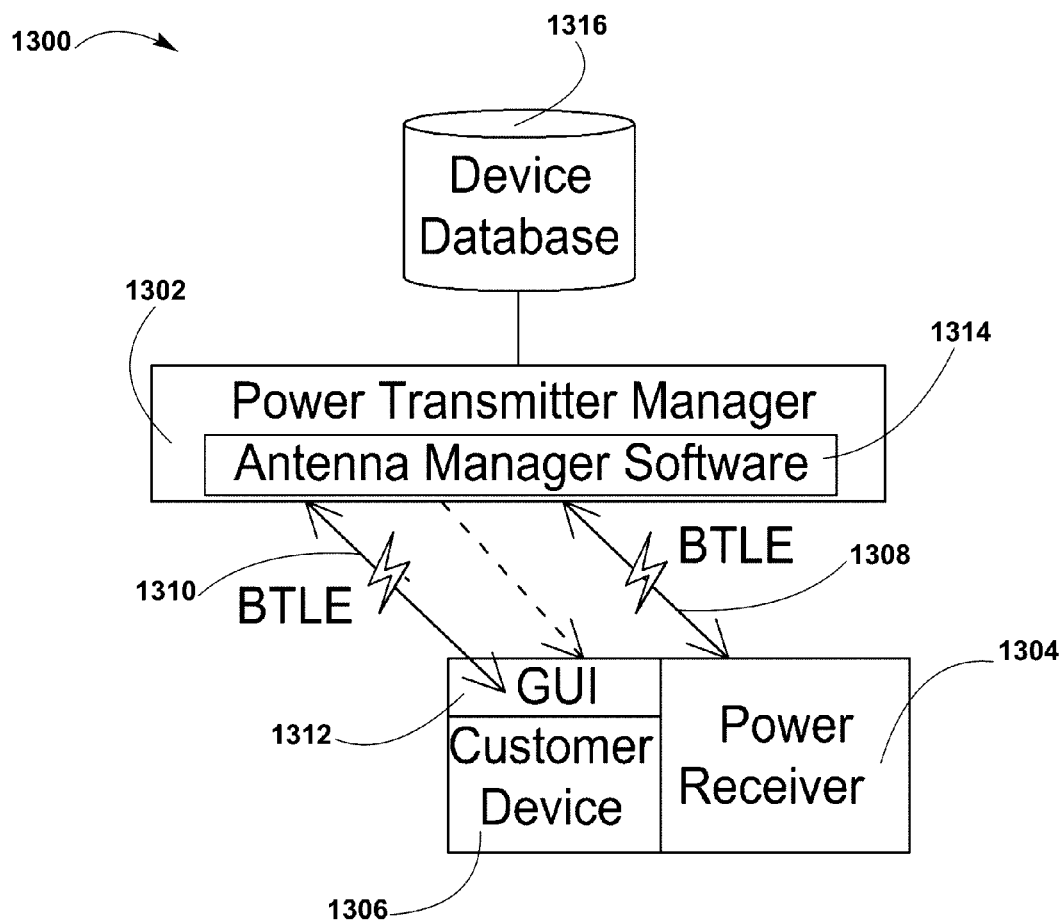
FIG. 13 shows a wireless power system using a wireless power transmitter manager, according to an embodiment.

B. System and Method for Smart Registration of Wireless Power Receivers in a Wireless Power Network FIG. 13 shows a wireless power system 1300 using a wireless power transmitter manager 1302, according to an embodiment. Wireless power transmitter manager 1302 may include a processor with computer-readable medium, such as a random access memory (RAM) (not shown) coupled to the processor. Examples of processor may include a microprocessor, an application specific integrated circuit (ASIC), and field programmable object array (FPOA), among others.

Wireless power transmitter manager 1302 may transmit controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a wireless power receiver converting the transmitted energy to electrical power. These RF waves may be controlled through phase and/or relative amplitude adjustments to form constructive and destructive interference patterns (pocket-forming). Pockets of energy may form at constructive interference patterns and can be 3-dimensional in shape, whereas null-spaces may be present outside the constructive interference patterns.

Wireless power receiver 1304 may be paired with customer device 1306 or may be built into customer device 1306. Examples of customer devices 1306 may include laptop computer, mobile device, smartphones, tablets, music players, and toys, among other. Customer device 1306 may include a graphical user interface 1312 (GUI) as part of wireless power system 1300 software downloaded and installed from public application store.

Wireless power transmitter manager 1302 may receive customer device's signal strength from advertisement emitted by wireless power receiver 1304 for the purpose of detecting if wireless power receiver 1304 is nearer to wireless power transmitter manager 1302 than to any other wireless power transmitter manager 1302 in system 1300. Graphical user interface 1312 (GUI) may receive customer device's signal strength from advertisement emitted by wireless power receiver 1304 for the purpose of detecting if wireless power receiver 1304 is paired with graphical user interface 1312 (GUI).

According to some aspects of this embodiment, wireless power transmitter manager 1302 may include a device database 1316, where device database 1316 may store information about all network devices, such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager 1302 may send power in a range up to 30 feet.

Wireless power transmitter manager 1302 may use, but is not limited to, Bluetooth low energy (BLE) to establish a communication link 1308 with wireless power receiver 1304 and a control link 1310 with customer device's graphical user interface (GUI). Wireless power transmitter manager 1302 may use control link 1310 to receive commands from and receive pairing information from customer device's graphical user interface (GUI).

Wireless power transmitter manager 1302 may include antenna manager software 1314 to track customer device 1306. Antenna manager software 1314 may use real time telemetry to read the state of the power received in customer device 1306.

Wireless power transmitter manager 1302 may create a wireless energy area model which includes information about all the movements in the system. This information may be stored in device database 1316.

In other situations, there can be multiple wireless power transmitter managers 1302 and/or multiple wireless power receivers 1304 for powering multiple and various customer devices 1306.

Figure 14:
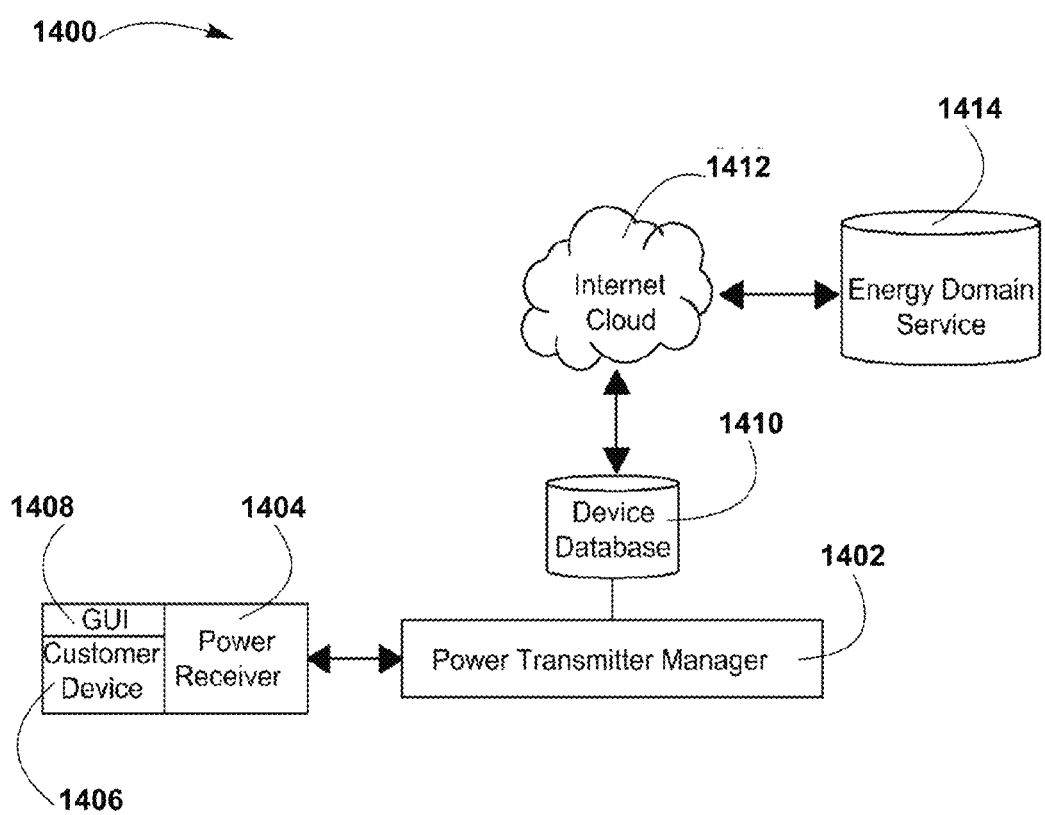
FIG. 14 illustrates a system architecture for smart registration of wireless power receivers within a wireless power network, according to another embodiment.

FIG. 14 illustrates a system architecture for smart registration 1400 of wireless power receivers within a wireless power network, according to another embodiment.

In a wireless power network, one or more wireless power transmitter managers and/or one or more wireless power receivers may be used for powering various customer devices.

Each wireless power device in the wireless power network may include a universally unique identifier (UUID). Examples of wireless power devices may include wireless power transmitter manager, wireless power receiver, end user hand-held or mobile devices, and servers, among others.

A wireless power transmitter manager 1402 may include a processor with computer-readable medium, such as a random access memory (RAM) (not shown) coupled to the processor. Examples of processor may include a microprocessor, an application specific integrated circuit (ASIC), and a field programmable object array (FPOA), among others.

According to some aspects of this embodiment, each wireless power device bought by a customer may be registered at the time of purchase, or registered later by the customer using public accessible web page or smart device application that communicates to energy domain service 1414. The device may registered with the wireless power network, via a registry stored in an energy domain service 1414.

Energy domain service 1414 may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, Pay Pal account, or any other method of payment, address, and wireless power device UUID, among others. The registry may indicate whether wireless power transmitter manager 1402 is for business, commercial, municipal, government, military, or home use. The registry may also include different access policies for each wireless power transmitter manager 1402, depending on it use, for example if wireless power transmitter manager 1402 will be for businesses use, the customer may need to define whether the power transfer will be charged or not.

In a different aspect of this embodiment, a wireless power receiver 1404 may include a nonvolatile memory for storing wireless power transmitter manager 1402 universally unique identifier (UUID). Examples of nonvolatile memory may include read-only memory, flash memory, ferroelectric RAM (F-RAM) hard disks, floppy disks, and optical discs, among others. Wireless power receiver 1404 may be paired with customer device 1406 or may be built into customer device 1406. Examples of customer devices 1406 may include laptop computer, mobile device, smartphone, tablet, music player, and toys, among other. Customer device 1406 may include a graphical user interface 1408 (GUI) as part of wireless power system software downloaded and installed from public application store.

According to some aspects of this embodiment, wireless power transmitter manager 1402 may include a device database 1410, where device database 1410 may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager 1402 may send power in a range up to 30 feet.

According to some aspects of this embodiment, wireless power transmitter manager 1402 may detect customer device's signal strength from advertisement emitted graphical user interface 1408 (GUI) for the purpose of detecting if wireless power receiver 1404 is paired with graphical user interface 1408 (GUI). Wireless power transmitter manager 1402 may also detect if wireless power receiver 1404 is nearer to wireless power transmitter manager 1402 than to any other wireless power transmitter manager 1402 in the wireless power network through an analysis of each device database records in the wireless power system 1400. Each record may include a list of each wireless power receiver 1404 and its signal strength relative to and detected by wireless power transmitter manager 1402. Then wireless power receiver 1404 may be assigned to wireless power transmitter manager 1402, which may have exclusive control and authority to change the wireless power receiver's record in distributed system device database 1410 until wireless power receiver 1404 moves to a new location closer to another wireless power transmitter manager 1402. If wireless power receiver 1404 change to new location closer to another wireless power transmitter manager 1402, then wireless power transmitter manager 1402 (with control over wireless power receiver 1404) may update wireless power receiver's record with its UUID.

If wireless power receiver 1404 tries to charge using wireless power transmitter manager 1402, then wireless power transmitter manager 1402 may verify with energy domain service 1414 if it is authorized to send power to wireless power receiver 1404. Therefore wireless power transmitter manager 1402 may establish a communication connection with wireless power receiver 1404 to request its universally unique identifier (UUID). Wireless power receiver 1404 may send UUID to wireless power transmitter manager 1402. Wireless power transmitter manager 1402 may establish communication connection with energy domain service 1414 and then send its UUID and wireless power receiver 1404 UUID to energy domain service 1414 through an internet cloud 1412, where internet cloud 1412 may be any suitable connections between computers such as, for example, intranets, local area networks (LAN), virtual private networks (VPN), wide area networks (WAN) and the internet among others. Once energy domain service 1414 receives wireless power transmitter UUID and wireless power receiver 1404 UUID, it may inspect the registry for wireless power transmitter manager 1402 using UUID. Registry may include access policy for wireless power transmitter manager 1402. Energy domain service 1414 may determine through the access policy whether wireless power transmitter manager 1402 needs to pay to receive power. If wireless power transmitter manager 1402 access policy states that wireless power receiver 1404 with UUID needs to pay to receive power, energy domain service 1414 may verify whether a credit card, Pay Pal, or other payment method, may be denoted within wireless power receiver 1404 registry. If a payment method is associated with wireless power receiver 1404, energy domain service 1414 may send a message to wireless power transmitter manager 1402 authorizing the power transfer to wireless power receiver 1404. Wireless power transmitter manager 1402 may report energy consumption statistics to energy domain service 1414 for subsequent billing of wireless power receiver's owner. Energy consumption statistics may be stored in device database 1410 and also may be sent to energy domain service 1414 and saved in wireless power receiver's registry.

If no payment method is associated with wireless power receiver 1404, energy domain service 1414 may send a message to wireless power transmitter manager 1402 denying the power transfer to wireless power receiver 1404.

In the case wireless power transmitter manager 1402 access policy states that no charge will be applied to certain wireless power receivers 1404, then energy domain service 1414 may confirm if wireless power receiver 1404 is allowed to receive power from wireless power transmitter manager 1402. If wireless power receiver 1404 is allowed to receive power from wireless power transmitter manager 1402, then, energy domain service 1414 may send a message to wireless power transmitter manager 1402 authorizing the power transfer to wireless power receiver 1404. Otherwise energy domain service 1414 may send a message to wireless power transmitter manager 1402 denying the power transfer to wireless power receiver 1404.

According to some aspect of this embodiment, a customer, may be able to select through a GUI device, which wireless power receivers 1404 may receive charge from wireless power transmitter manager 1402. In the GUI device, customer may be able to visualize each wireless power receiver 1404 near wireless power transmitter manager 1402, then, customer may select which wireless power receivers 1404 are allowed to receive charge from wireless power transmitter manager 1402. This information may be stored in device database 1410 and also may be sent to energy domain service 1414.

In a different aspect of this embodiment, a proprietor or clerk of a commercial or retail business establishment that owns a wireless power system may be able to select through the GUI device a wireless power receiver 1404 to receive power from one or more wireless power transmitter managers 1402 within power range of wireless power receiver 1404. The customer may be provided with a pre-authorized wireless power receiver 1404 at business establishment by proprietor or clerk. The wireless power receiver 1404 may be attached to customer's device. The proprietor or clerks may specify to GUI device the customer's method of payment (credit card, Pay Pal, cash, among others). Immediately the wireless power transmitter manager 1402 that belong to business establishment may start sending power to the customer device that is attached to pre-authorized wireless power receiver 1404. Customer may be billed on behalf of business establishment for power provided. Also in the GUI device, proprietor or clerk may be able to visualize power received by wireless power receiver 1404 and the amount to bill for power received. This information may be stored in distributed system device database 1410 and also may be sent to energy domain service 1414.

Figure 15:
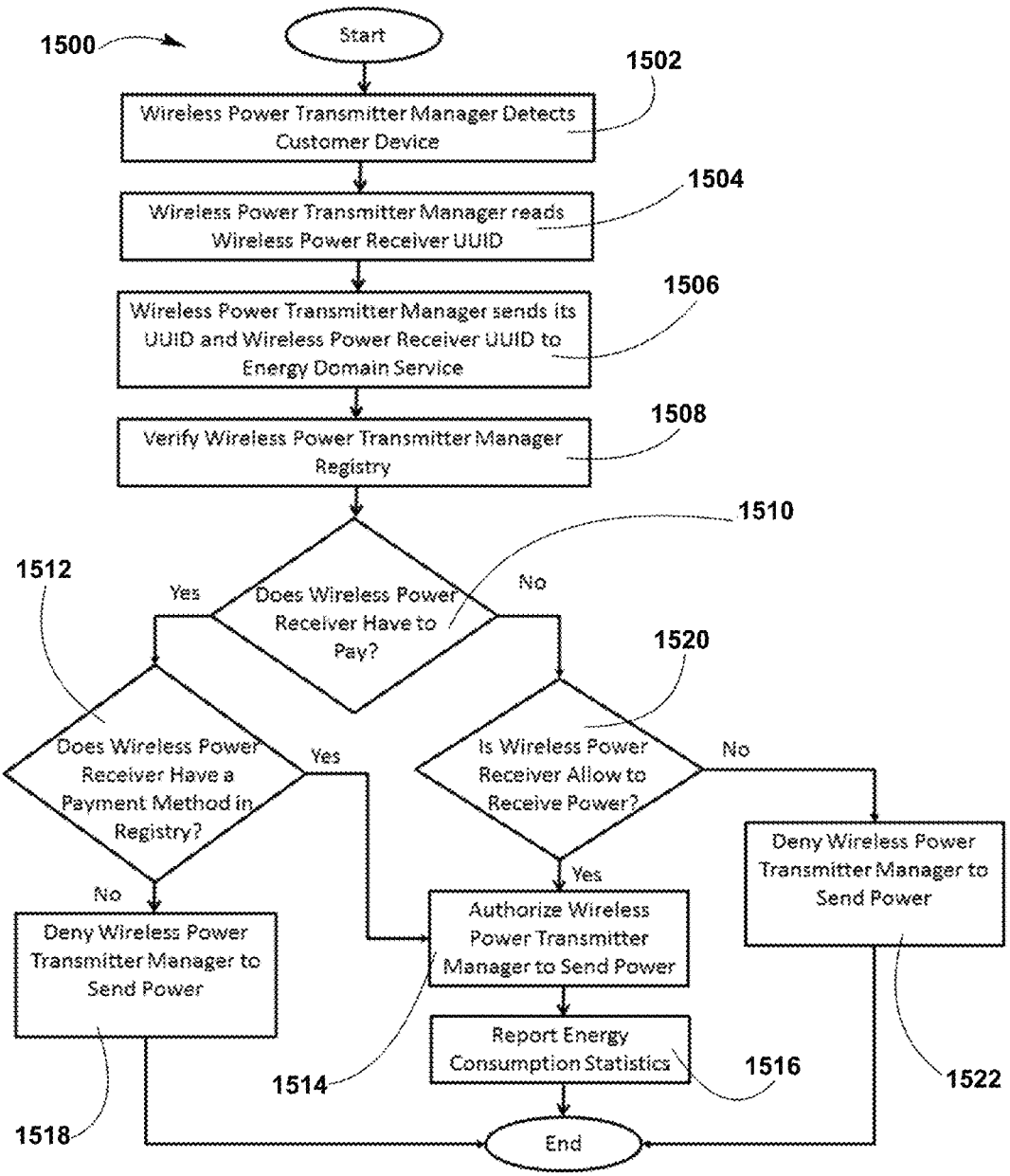
FIG. 15 is a flowchart of a method for smart registration of wireless power receivers within a wireless power network, according to a further embodiment.

FIG. 15 is a flowchart of a method for smart registration 1500 of wireless power receivers within a wireless power network, according to a further embodiment.

In a wireless power network, one or more wireless power transmitter managers and/or one or more wireless power receivers may be used for powering various customer devices. Each wireless power device in the wireless power network may include a universally unique identifier (UUID). Examples of wireless power devices may include wireless power transmitter manager, wireless power receiver, end user hand-held or mobile devices and servers, among others.

The method may start at step 1502 when a wireless power transmitter manager detects a customer device. Customer device may be paired with wireless power receiver or wireless power receiver may be built in a customer device. Example of customer devices may include smartphones, mobile device, tablets, music players, toys and others at the same time. Customer device may include a graphical user interface (GUI) as part of wireless power system software downloaded and installed from public application store.

Wireless power transmitter manager may detect customer device's signal strength from advertisement emitted graphical user interface (GUI) for the purpose of detecting if wireless power receiver is paired with graphical user interface (GUI). Wireless power transmitter manager may also detect if wireless power receiver is nearer to wireless power transmitter manager than to any other wireless power transmitter manager in the wireless power network through an analysis of each device database records in the wireless power system. Each record may include a list of each wireless power receiver and its signal strength relative to and detected by wireless power transmitter manager. Then wireless power receiver may be assigned to wireless power transmitter manager, which may have exclusive control and authority to change the wireless power receiver's record in distributed system device database until wireless power receiver moves to a new location closer to another wireless power transmitter manager.

According to some aspects of this embodiment, Device database may store information about all network devices such as universally unique identifier (UUID), serial number, signal strength, identification of paired partner device, customer device's power schedules and manual overrides; customer device's past and present operational status, battery level and charge status, hardware value measurements, faults, errors, and significant events; names, customer's authentication or authorization names, and configuration details running the system, among others.

Wireless power transmitter manager may establish a communication connection with wireless power receiver indicating is within range to receive charge. Wireless power transmitter manager may send power in a range up to 30 feet.

If wireless power receiver tries to obtain charge from wireless power transmitter manager, wireless power transmitter manager may verify with energy domain service if it is authorized to send power to wireless power receiver. Therefore wireless power transmitter may establish a communication connection with wireless power receiver to request universally unique identifier (UUID). Wireless power receiver may send UUID to wireless power transmitter manager. Wireless power transmitter manager may read wireless power receiver UUID, at step 1504.

Energy domain service may be one or more cloud-based servers and each cloud-based servers may include a database that may store a registry for each wireless power device purchased by a customer. Cloud-based servers may be implemented through known in the art database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that may organize collections of data. The registry may include customer's name, customer's credit card, address, and wireless power device UUID, among others. The registry may indicate whether wireless power transmitter manager is for business, commercial, municipal, government, military, or home use. The registry may also include different access policies for each wireless power transmitter manager, depending on it use, for example if wireless power transmitter manager will be for businesses use, the customer may need to define whether the power transfer will be charged or not.

According to some aspects of this embodiment, each wireless power device bought by a customer may be registered at the time of purchase, or registered later by the customer using public accessible web page or smart device application that communicates to energy domain service.

Wireless power transmitter manager may send its UUID and also wireless power receiver UUID to an energy domain service through the internet cloud, at step 1506. Internet cloud may be any suitable connections between computers such as, for example, intranets, local area networks (LAN), virtual private networks (VPN), wide area networks (WAN) and the internet among others.

Energy domain service may inspect the registry for wireless power transmitter manager using UUID, at step 1508. Registry may include access policy for wireless power transmitter manager.

Energy domain service may determine through the access policy whether wireless power transmitter manager needs to pay to receive power, at step 1510.

If wireless power transmitter manager access policy states that wireless power receiver with UUID needs to pay to receive power, energy domain service may verify whether a credit card, Pay Pal, or other payment method, may be denoted within wireless power receiver registry, at step 1512.

If a payment method is associated with wireless power receiver registry, energy domain service may send a message to wireless power transmitter manager authorizing the power transfer to wireless power receiver, at step 1514.

Wireless power transmitter manager may report energy consumption statistics to energy domain service for subsequent billing of wireless power receiver's owner, at step 1516. Energy consumption statistics may be stored in device database and also may be sent to energy domain service and saved in wireless power receiver's registry.

In the case no payment method is associated with wireless power receiver, energy domain service may send a message to wireless power transmitter manager denying the power transfer to wireless power receiver, at step 1518.

Else, if wireless power transmitter manager access policy states that no charge will be applied to a certain wireless power receiver which may be trying to obtain power from wireless power transmitter manager, energy domain service may confirm whether wireless power receiver is allowed to receive power from wireless power transmitter manager, at step 1520.

If wireless power receiver is allowed to receive power from wireless power transmitter manager. Energy domain service may send a message to wireless power transmitter manager authorizing the power transfer to wireless power receiver, at step 1514.

Wireless power transmitter manager may report energy consumption statistics to energy domain service, at step 1516. Energy consumption statistics may be stored in device database and also may be sent to energy domain service and saved in wireless power receiver's registry.

Otherwise if wireless power receiver is not allowed to receive power from wireless power transmitter manager, energy domain service may send a message to wireless power transmitter manager denying the power transfer to wireless power receiver, at step 1522.

According to some aspect of this embodiment, a customer may be able to select through a GUI device which wireless power receivers may receive charge from wireless power transmitter manager. In the GUI device, customer may be able to visualize each wireless power receiver near to wireless power transmitter manager, then customer may select which wireless power receivers are allowed to receive charge from wireless power transmitter manager. This information may be stored in device database and also may be sent to energy domain service.

EXAMPLES

Example #1 is a wireless power network with components similar to those described in FIG. 14. A customer may have a wireless power transmitter manager in his/her house. The customer invites three friends to watch a football game. Two of the three friends have a wireless power receiver cover paired with their cellphones. When both wireless power receivers are within the range of the wireless power transmitter manager, they may receive a message from wireless power transmitter manager indicating they are within range to receive power. One of the wireless power receivers may try to obtain power from wireless power transmitter manager, but first the wireless power transmitter manager may verify whether wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that no charge will be applied for using wireless power transmitter manager and that any wireless power receiver is able to receive charge from it. Energy domain service may verify wireless power receiver registry and then energy domain service may authorize wireless power transmitter manager to send power to wireless power receiver.

Example #2 is a wireless power network with components similar to those described in FIG. 14. A restaurant may have a wireless power transmitter manager. A customer within the restaurant has a cellphone with a wireless power receiver cover. The customer may want to charge his/her cellphone while having dinner. The customer tries to charge his/her cellphone using wireless power transmitter manager, the wireless power transmitter manager may need to verify if wireless power receiver is authorized to receive power. Therefore wireless power transmitter manager may send its own UUID and wireless power receiver UUID to an energy domain service. Energy domain service may verify access policy for wireless power transmitter manager to determine if a billing charge has to be applied for using wireless power transmitter manager. The access policy for wireless power transmitter manager may indicate that a charge will be applied for using wireless power transmitter manager. Then, energy domain service may verify wireless power register to determine whether a method of payment such as credit card or other method is associated with wireless power receiver. If a payment method is on the registry file, energy domain service may authorize wireless power transmitter manager to send power to wireless power receiver. Wireless power transmitter manager may track the amount of power sent to wireless power receiver. This information may be stored in device database and also may be sent to energy domain service to generate a bill, on behalf of the restaurant.

Figure 16:
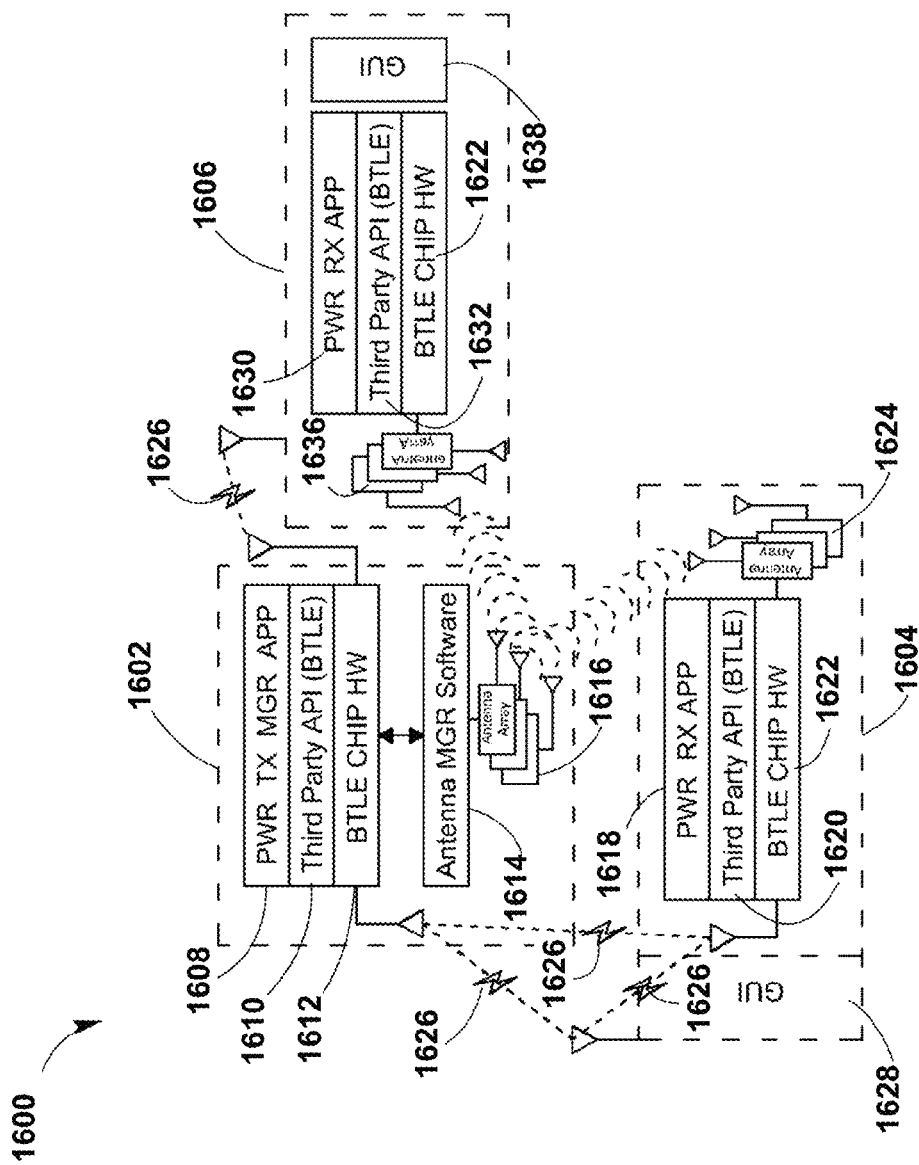
FIG. 16 shows a system architecture in which one or more embodiments of the present disclosure may operate.

C. System and Method for Generating a Power Receiver Identifier in a Wireless Power Network FIG. 16 shows a system architecture 1600 that may enable registration and communication controls between wireless power transmitter 1602 and one or more wireless power receivers within a wireless power network. In some embodiments, the one or more wireless power receiver may be permanently integrated or detachably coupled to one or more customer pocket-forming enabled devices 1606, thereby forming a single integrated product or unit (integrated receiver 1604). For example the integrated receiver 1604 could take the form of a cover of a customer pocket-forming enabled device 1606.

In one embodiment, wireless power transmitter 1602 may include a microprocessor that integrates a power transmitter manager app 1608 (PWR TX MGR 38P), and a third party application programming interface 1610 (Third Party API) for a Bluetooth Low Energy chip 1612 (BLE CHIP HW). In some embodiment, Bluetooth Low Energy chip 1612 may be another type of wireless protocol such as Wi-Fi or the like. Wireless power transmitter 1602 may also include an antenna manager software 1614 (Antenna MGR Software) to control an RF antenna array 1616 that may be used to transmit controlled RF waves that act as power transmission signals that may converge in 3-d space and create pockets of energy on wireless power receivers. Although the exemplary embodiment recites the use of RF waves as power transmission signals, the power transmission signals may include any number of alternative or additional techniques for transmitting energy to a receiver converting the transmitted energy to electrical power.

Power transmitter manager app 1608 may include a database (not shown), which may store relevant information from wireless power receivers such as, identifiers, voltage ranges, location, signal strength and/or any relevant information from the wireless power receiver.

Power transmitter manager app 1608 may call third party application programming interface 1610 for running a plurality of functions such as start a connection, end a connection, and send data among others. Third party application programming interface 1610 may command Bluetooth Low Energy chip 1612 according to the functions called by power transmitter manager app 1608.

Third party application programming interface 1610 at the same time may call power transmitter manager app 1608 through a callback function which may be registered in the power transmitter manager app 1608 at boot time. Third party application programming interface 1610 may have a timer callback that may go for ten times a second, and may send callbacks every time a connection begins, a connection ends, a connection is attempted, or a message is received.

Integrated receivers 1604 may include a power receiver app 1618 (PWR RX 38P), a third party application programming interface 1620 (Third party API) for a Bluetooth Low Energy chip 1622 (BLE CHIP HW), and a RF antenna array 1624 which may be used to receive and utilize the pockets of energy sent from wireless power transmitter 1602.

Power receiver app 1618 may call third party application programming interface 1620 for running a plurality of functions such as start a connection, end the connection, and send data among others. Third party application programming interface 1620 may have a timer callback that may go for ten times a second, and may send callbacks every time a connection begins, a connection ends, a connection is attempted, or message is received.

Integrated receivers 1604 may be paired to a wireless device such as a smartphone, or tablet among others via a BLE connection 1626 by using a graphical user interface (GUI 1628) that may be downloaded from any suitable application store and may run on any suitable operating system such as iOS and Android, among others. Integrated receivers 1604 may also communicate with wireless power transmitter 1602 via a BLE connection 1626 to send important data such as an identifier for the device as well as battery level information, antenna voltage, geographic location data, real-time received power feedback, or other information that may be of use for the wireless power transmitter 1602.

In other embodiments, GUI 1628 may also be installed on a wireless device (smartphones or tablets) that may not have an integrated receivers 1604. GUI 1628 may perform operations to communicate with power transmitter manager app 1608 via BLE connection 1626 or any other wireless communication protocols such as Wi-Fi, and LAN among others.

Customer pocket-forming enabled devices 1606 may refer to a wireless device such as smartphones, tablets, or any of the like that may include an integrated wireless power receiver chip (not shown in FIG. 1) for wireless power charging. Customer pocket-forming enabled devices 1606 may include a power receiver app 1630 (PWR RX 38P), and a third party application programming interface 1632 (Third Party API) for a Bluetooth Low Energy chip 1634 (BLE CHIP HW). Customer pocket-forming enabled devices 1606 may also include an RF antenna array 1636 which may used to receive and utilize pockets of energy sent from wireless power transmitter 1602. GUI 1638 may be downloaded from any suitable application store and may run on any suitable operating system such as iOS and Android, among others.

Power receiver app 1630 may call third party application programming interface 1632 for running a plurality of functions such as start a connection, end the connection, and send data among others. Third party application programming interface 1632 may have a timer callback that may go for ten times a second, and may send callbacks every time a connection begins, a connection ends, a connection is attempted, or message is received.

Customer pocket-forming enabled devices 1606 may also communicate with wireless power transmitter 1602 via a BLE connection 1626 to send important data such as an identifier for the device as well as battery level information, antenna voltage, geographic location data, real-time received power feedback, or other information that may be of use for the wireless power transmitter 1602.

Figure 17:
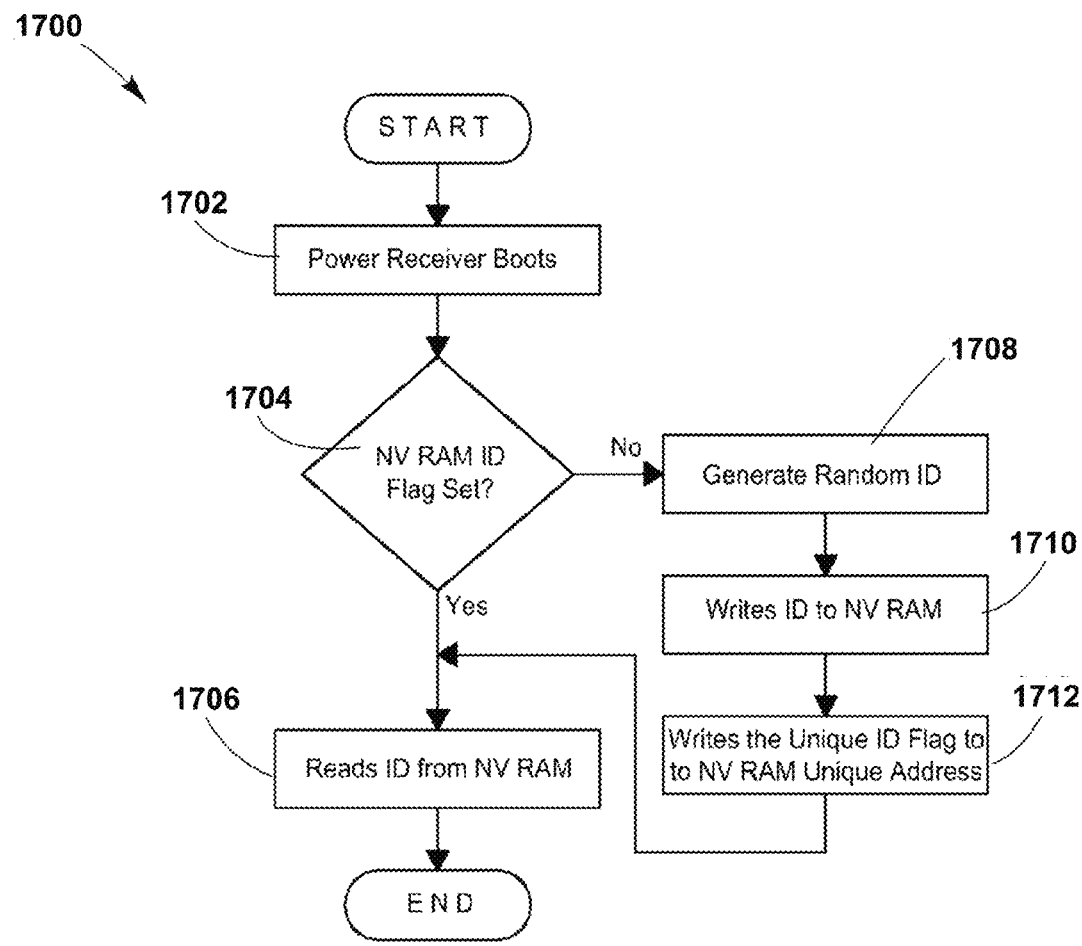
FIG. 17 shows a flowchart of a method that may be used to generate a unique identifier for a wireless power receiver device within a wireless power network.

FIG. 17 shows a flowchart of a method 1700 that may be used to generate a unique identifier for one or more wireless power receiver within a wireless power network.

Method 1700 may include automated software embedded on a wireless power receiver chip that may be triggered the first time a wireless power receiver is turned on.

In one embodiment, method 1700 may start at step 1702 when a wireless power receiver, either an integrated receiver or a receiver separate from a customer pocket-forming enabled device, boots up the first time within a wireless power network. Then, at step 1704, method 1700 may check if the ID flag at a unique address is in non-volatile (NV) RAM is set in the wireless power receiver. If ID flag is set, at step 1706, the method 1700 reads from its unique address in NVRAM in the wireless power receiver and it continues normal operation. If ID flag is not set, then at step 1708, the method 1700 triggers a suitable random number generator method to generate a random ID which may be 32-bits or greater. Once the ID is generated, at step 1710, the method 1700 writes the ID to its unique address in NV RAM. Finally, at step 1712, method 1700 may write the unique 32-bits (or greater) ID flag to unique address in NV RAM, read ID from NV RAM and continue normal operation.

In another embodiment, method 1700 may also be used to not only generate unique IDs for wireless power receivers, but also to generate unique IDs for wireless power transmitters and GUIs. By generating unique IDs for each of the components in a wireless power network, the components may be more easily associated to users and have friendly names. For example, a user may have in his or her home more than one wireless power transmitter located at different places such as the living room, bedrooms, and kitchen among others. Then the power transmitter's unique ID may be associated with a custom label for each of the wireless power transmitters at different locations.

Figure 18:
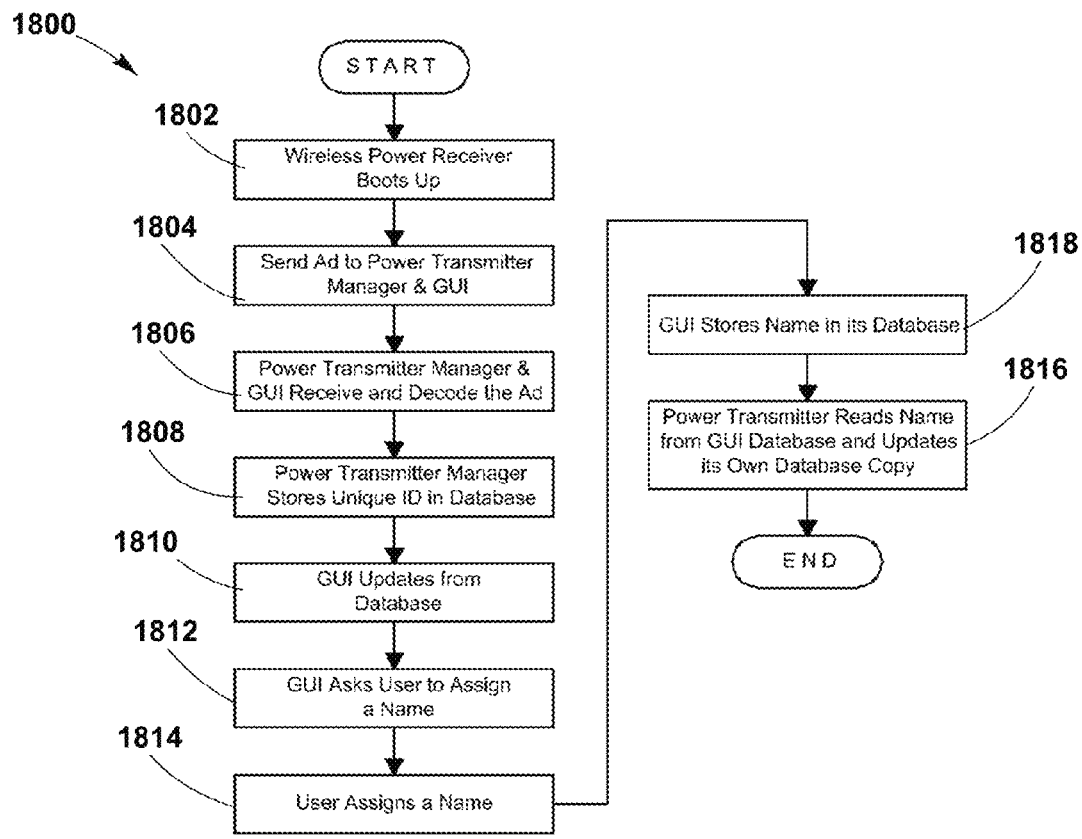
FIG. 18 shows a flowchart of a method for registering and associating a wireless power receiver to a wireless power network.

FIG. 18 shows a flowchart of a method 1800 for registering and associating one or more wireless power receivers to a wireless power network.

In one aspect of the present disclosure, method 1800 may include automated software embedded on a wireless power receiver chip that may be triggered when a wireless power receiver boots up. Therefore, method 1800 may start at step 1802, when a wireless power receiver boots up when turned on by the user. Then, at step 1804, the wireless power receiver broadcasts advertisement, which may include a unique ID number, to any power transmitter manager and GUI that is within its range. Next, at step 1806, power transmitter manager and GUI, that are within the radio of the wireless power receiver broadcast, receive and decode the advertisement. Then, power transmitter manager, at step 1808, may store the unique ID number of the wireless power receiver in a database. This database may serve to store relevant information from wireless power receivers such as, identifiers, voltage ranges, location, signal strength and/or any relevant information. Following method 1800, at step 1810, GUI may update and sync all relevant information from the transmitter's database for better control of the wireless power devices. At step 1812, GUI may ask the user to assign a name for the wireless power receiver that may have joined the wireless power network. Next, at step 1814, the user assigns a name of its preference. Then, at step 1816, GUI syncs that name and stores it in its database. Finally, at step 1818, power transmitter manager reads name from GUI database and updates its own database copy. The system database in power transmitter devices and GUI devices may be identical between every device, when up to date. All system devices may operate and communicate so as to keep each one's database up to date.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A wireless power system configured to provide pocket-forming energy in three-dimensional space, comprising:
    a plurality of wireless power transmitters, each wireless power transmitter comprising
        a power transmitter manager comprising an antenna manager, and
        a storage comprising a device database, wherein the storage is operatively coupled to the power transmitter manager,
    wherein a wireless power transmitter of the plurality of wireless power transmitters is configured to receive authorization data from a device coupled to a receiver, and to determine an authorization state for the device based at least in part on the received authorization data; and
    a server comprising a memory configured to store data records indicating a signal strength associated with the receiver and received from at least one of the plurality of wireless power transmitters, wherein the power transmitter manager of the wireless power transmitter is configured to determine if the receiver is closest to the power transmitter relative to the plurality of wireless power transmitters based upon the signal strength of the receiver,
    wherein each wireless power transmitter is configured to control transmission of power waves in three-dimensional space via the antenna manager based on the authorization state, and
    wherein the power transmitter manager of the wireless power transmitter is configured to update a data record for the receiver of the data records stored in the server, the data record updated based on one or more signals from the receiver indicating an amount of power received by the receiver when the wireless power transmitter is closest to the receiver as indicated by the signal strength.

2. The wireless power system of claim 1, wherein the authorization data comprises at least one of a device identification, a customer name associated with the device, a payment mechanism for a customer associated with the device, and an access policy for the customer associated with the device.

3. The wireless power system of claim 1, wherein the device database comprises at least one of device network identification data, device serial number data, device signal strength data, paired device data, device power schedule data, device operational status, device battery level data, device charge status data, device hardware value measurement data, device fault data, device error data, device authorization data, and device system configuration data.

4. The wireless power system of claim 1, wherein the power transmitter manager is configured to communicate with an energy domain service.

5. The wireless power system of claim 4, wherein the power transmitter manager is configured to receive registry data from the energy domain service, wherein the registry data comprises at least one of a device identification, a customer name associated with the device, a payment mechanism for a customer associated with the device, and an access policy for the customer associated with the device.

6. The wireless power system of claim 4, wherein the power transmitter manager is configured to determine the authorization state via communication with the energy domain service.

7. The wireless power system of claim 1, wherein the power transmitter manager is configured to track an amount of pocket-forming energy generated by the power waves after the authorization state is determined.

8. A method for operating a wireless power system configured to provide pocket-forming energy in three-dimensional space, the method comprising:
    receiving, by a power transmitter manager in communication with a wireless power transmitter of a plurality of wireless power transmitters, authorization data for a device coupled to a receiver;
    determining, by the wireless power transmitter, an authorization state for the device based at least in part on the received authorization data;
    determining, by the power transmitter manager of the wireless power transmitter, if the receiver is closest to the wireless power transmitter relative to the plurality of wireless power transmitters based upon database records indicating a signal strength associated with a receiver and received from at least one of the plurality of wireless transmitters;
    controlling, by the wireless power transmitter, transmission of power waves by an antenna manager of the wireless power transmitter in three-dimensional space, based on the authorization state of the receiver; and
    receiving, by the wireless power transmitter, one or more signals from the receiver indicating the amount of power received by the receiver from the wireless power transmitter; and
    updating, by the power transmitter manager of the wireless power transmitter, a database record for the receiver according to the one or more signals, when the wireless power transmitter is closest to the receiver with respect to each wireless power transmitter of the plurality of wireless power transmitters.

9. The method of claim 8, wherein the authorization data comprises at least one of a device identification, a customer name associated with the device, a payment mechanism for a customer associated with the device, and an access policy for the customer associated with the device.

10. The method of claim 8, further comprising:
    storing, in a device database of the wireless power transmitter, at least one of device network identification data, device serial number data, device signal strength data, paired device data, device power schedule data, device operational status, device battery level data, device charge status data, device hardware value measurement data, device fault data, device error data, device authorization data, and device system configuration data, wherein the device database is associated with the power transmitter manager, and the authorization state is determined at least in part from the data stored in the device database.

11. The method of claim 8, further comprising communicating data between the power transmitter manager and an energy domain service.

12. The method of claim 11, further comprising receiving, in the power transmitter manager of the wireless power transmitter, registry data from the energy domain service, wherein the registry data comprises at least one of a device identification, a customer name associated with the device, a payment mechanism for a customer associated with the device, and an access policy for the customer associated with the device.

13. The method of claim 12, wherein the authorization state is determined at least in part from the registry data.

14. The method of claim 8, further comprising tracking, in the power transmitter manager of the wireless power transmitter, an amount of pocket-forming energy generated after the authorization state is determined.

15. A method for operating a wireless power system configured to provide pocket-forming energy in three-dimensional space, comprising:

establishing, by a wireless power transmitter of a plurality of wireless power transmitters, a communications link with a receiver via a power transmitter manager;

receiving, by the wireless power transmitter, authorization data for a device coupled to the receiver via the communications link;

determining, by the wireless power transmitter, an authorization state for the device based at least in part on the received authorization data;

determining, by a power transmitter manager of the wireless power transmitter, that the receiver is closest to the wireless power transmitter with respect to each of the plurality of wireless power transmitters based upon database records indicating a signal strength associated with the receiver and measured by at least one of the plurality of wireless transmitters;

controlling, by the wireless power transmitter, the generation of pocket-forming energy in three-dimensional space via the power transmitter manager based on the authorization state; and receiving, by the wireless power transmitter, one or more signals from the receiver indicating the amount of power received by the receiver updating, by the power transmitter manager of the wireless power transmitter, a database record for the receiver according to the one or more signals, when the wireless power transmitter is closest to the receiver with respect to each wireless power transmitter of the plurality of wireless power transmitters.

16. The method of claim 15, wherein the authorization data comprises at least one of a device identification, a customer name associated with the device, a payment mechanism for a customer associated with the device, and an access policy for the customer associated with the device.

17. The method of claim 15, further comprising storing, in a device database of the wireless power transmitter, at least one of device network identification data, device serial number data, device signal strength data, paired device data, device power schedule data, device operational status, device battery level data, device charge status data, device hardware value measurement data, device fault data, device error data, device authorization data, and device system configuration data, wherein the device database is associated with the power transmitter manager, and wherein the authorization state is determined at least in part from the data stored in the device database.

18. The method of claim 15, further comprising communicating data between the power transmitter manager and an energy domain service.

19. The method of claim 18, further comprising receiving, in the wireless power transmitter, registry data from the energy domain service in the power transmitter manager, wherein the registry data comprises at least one of a device identification, a customer name associated with the device, a payment mechanism for a customer associated with the device, and an access policy for the customer associated with the device.

20. The method of claim 19, wherein the authorization state is determined at least in part from the registry data.

* * * * *